US008050196B2

(12) United States Patent
Yoon

(10) Patent No.: US 8,050,196 B2
(45) Date of Patent: Nov. 1, 2011

(54) METHOD AND APPARATUS FOR CONTROLLING PACKET TRANSMISSIONS WITHIN WIRELESS NETWORKS TO ENHANCE NETWORK FORMATION

(75) Inventor: Chang-June Yoon, Edison, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 232 days.

(21) Appl. No.: 12/500,292

(22) Filed: Jul. 9, 2009

(65) Prior Publication Data
US 2011/0007669 A1 Jan. 13, 2011

(51) Int. Cl.
*H04L 12/28* (2006.01)
(52) U.S. Cl. .................................. 370/255; 370/408
(58) Field of Classification Search ................. None
See application file for complete search history.

(56) References Cited

U.S. PATENT DOCUMENTS

| | | | |
|---|---|---|---|
| 4,725,834 A | 2/1988 | Chang et al. | |
| 5,216,675 A | 6/1993 | Melliar-Smith et al. | |
| 5,631,907 A | 5/1997 | Guarneri et al. | |
| 6,178,172 B1 | 1/2001 | Rochberger | |
| 6,208,623 B1 | 3/2001 | Rochberger et al. | |
| 6,286,038 B1 | 9/2001 | Reichmeyer et al. | |
| 6,757,258 B1 | 6/2004 | Pillay-Esnault | |
| 6,885,643 B1* | 4/2005 | Teramoto et al. ............ 370/252 |
| 7,054,554 B1 | 5/2006 | McNamara et al. | |
| 7,103,371 B1 | 9/2006 | Liu | |
| 7,225,117 B1 | 5/2007 | Feldstein et al. | |
| 7,269,198 B1 | 9/2007 | Elliott et al. | |
| 7,280,495 B1 | 10/2007 | Zweig et al. | |
| 7,339,895 B2 | 3/2008 | Ozaki et al. | |
| 2003/0095504 A1 | 5/2003 | Ogier | |
| 2004/0028023 A1* | 2/2004 | Mandhyan et al. ............ 370/351 |
| 2004/0240669 A1 | 12/2004 | Kempf et al. | |
| 2005/0078672 A1* | 4/2005 | Caliskan et al. ............... 370/389 |
| 2005/0169220 A1 | 8/2005 | Sreemanthula et al. | |

(Continued)

FOREIGN PATENT DOCUMENTS
EP 1107522 A1 6/2001
(Continued)

OTHER PUBLICATIONS

Sze-Yao Ni et al., "The Broadcast Storm Problem in a Mobile Ad Hoc Network," Proc. ACM/IEEE MobiCom, Aug. 1999.

(Continued)

*Primary Examiner* — Phirin Sam
(74) *Attorney, Agent, or Firm* — Edell, Shapiro & Finnan, LLC

(57) ABSTRACT

Network formation in wireless networks according to an embodiment of the present invention is enhanced based on control of network formation packet transmissions (e.g., Packet Radio Organizational Packet (PROP) transmissions). A source-initiated approach controls re-transmission of inquiry/reply PROP packets based on the presence of a neighboring node. This reduces the size and amount of PROP packets transmitted during neighbor discovery. In addition, the source-initiated approach controls re-transmission of PROP packets indicating a change in an upstream or control type node (e.g., LNC PROP). In this case, the node determines the presence of steady-state conditions (e.g., maintenance of conditions for the original LNC PROP transmission), and enables a single re-transmission of the LNC PROP packet, thereby reducing the transmission of unnecessary or duplicate LNC PROP packets (e.g., containing substantially the same information as previously transmitted packets since conditions have remained the same).

24 Claims, 16 Drawing Sheets

U.S. PATENT DOCUMENTS

| | | | |
|---|---|---|---|
| 2005/0265261 A1 | 12/2005 | Droms et al. | |
| 2006/0077908 A1 | 4/2006 | Park et al. | |
| 2006/0089964 A1 | 4/2006 | Pandey et al. | |
| 2006/0198346 A1* | 9/2006 | Liu et al. | 370/338 |
| 2006/0203788 A1 | 9/2006 | Cheon et al. | |
| 2007/0083765 A1 | 4/2007 | Clevy et al. | |
| 2007/0099649 A1 | 5/2007 | Han et al. | |
| 2007/0127399 A1 | 6/2007 | Ookuma et al. | |
| 2007/0133539 A1 | 6/2007 | Kang et al. | |
| 2007/0153810 A1 | 7/2007 | Jang et al. | |
| 2007/0195746 A1 | 8/2007 | Ryu et al. | |
| 2007/0230458 A1 | 10/2007 | Baba et al. | |
| 2007/0242637 A1 | 10/2007 | Dynarski et al. | |
| 2007/0274232 A1 | 11/2007 | Axelsson et al. | |
| 2007/0286094 A1 | 12/2007 | Wigglesworth et al. | |
| 2008/0002625 A1 | 1/2008 | Cho et al. | |
| 2008/0013538 A1 | 1/2008 | Lee et al. | |
| 2008/0043665 A1 | 2/2008 | Jeon et al. | |
| 2008/0075145 A1 | 3/2008 | Balachandran et al. | |
| 2008/0076461 A1* | 3/2008 | Itaya et al. | 455/519 |
| 2008/0089277 A1* | 4/2008 | Alexander et al. | 370/328 |
| 2008/0186907 A1 | 8/2008 | Yagyuu et al. | |
| 2009/0109901 A1* | 4/2009 | Kondo et al. | 370/328 |

FOREIGN PATENT DOCUMENTS

| | | | |
|---|---|---|---|
| EP | 1134991 A2 | 9/2001 | |
| EP | 1134991 A3 | 7/2002 | |
| EP | 1324532 A2 | 7/2003 | |
| EP | 1701485 A1 | 9/2006 | |
| EP | 1758338 A1 | 2/2007 | |
| EP | 1763177 A1 | 3/2007 | |
| GB | 2409601 A | 6/2005 | |
| GB | 2430580 A | 3/2007 | |
| WO | 9207324 | 4/1992 | |
| WO | 0223833 A2 | 3/2002 | |
| WO | 03041304 A1 | 5/2003 | |
| WO | 2005076570 A1 | 8/2005 | |
| WO | 2005099189 A1 | 10/2005 | |
| WO | 2006047065 A2 | 5/2006 | |
| WO | 2007046597 A1 | 4/2007 | |
| WO | 2007052908 A1 | 5/2007 | |
| WO | 2007078040 A1 | 7/2007 | |
| WO | 2007121379 A1 | 10/2007 | |
| WO | 2008036129 A1 | 3/2008 | |

OTHER PUBLICATIONS

C. E. Perkins et al., "Ad-hoc On-Demand Distance Vector Routing," Proc. 2nd IEEE Workshop on Mobil Computing Systems and Applications (WMCSA) '99, New Orleans, FL., Feb. 1999.

T. Clausen et al., "Optimized Link State Routing Protocol," IETF RFC 3626, Oct. 2003.

Fei Dai et al., "Performance Analysis of Broadcast Protocols in Ad Hoc Networks Based on Self-Pruning," IEEE Trans. On Parallel and Distributed Systems, 15(11): 1027-1040, Nov. 2004.

Wei Lou et al., "Double-Covered Broadcast (DCB): A Simple Reliable Broadcast Algorithm in MANETs," INFOCOM, Mar. 7-11, 2004.

European Search Report dated Sep. 29, 2010, in Application No. 10167108.9.

Jubin J et al., "The DARPA Packet Radio Network Protocols", Proceedings of the IEEE, IEEE. New York, US, vol. 75, No. 1; Jan. 1, 1987; pp. 21-32.

Pease A C et al. "Performance of the Reliable All-Informed Voice Networking (RAVEN) System in Dynamic Network Topologies", Proceedings of IEEE Southeastcon 2001. Engineering the Future. Clemson, SC; Mar. 30-Apr. 1, 2001; pp. 49-54.

Ru-Sheng Liu et al., "District Dependent Retransmission Routing Protocol for Ad Hoc Mobile Wireless Networks", Parallel and Distributed Computing, Applications and Technologies; Proceedings of the Fourth International Conference Aug. 27-29, 2003, Piscataway, NJ; pp. 345-350.

* cited by examiner

METHOD AND APPARATUS FOR CONTROLLING PACKET TRANSMISSIONS WITHIN WIRELESS NETWORKS TO ENHANCE NETWORK FORMATION

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided by the terms of Contract No. DAAB07-03-9-K601 awarded by CECOM.

BACKGROUND

1. Technical Field

The present invention embodiments pertain to network formation in wireless networks. In particular, the present invention embodiments pertain to enhancing network formation in wireless networks based on control of network organizational packet transmissions.

2. Discussion of Related Art

Various commercial network formation protocols may be utilized for network formation within a wireless Mobile Ad-Hoc network (MANETs). In particular, a packet transmitted by a node within a wireless mobile Ad-Hoc network is received by all network nodes within RF range of the transmitting node. One of the objectives of these protocols is to minimize the total number of forward transmissions for broadcasting. Flooding is a simple approach, where each network node that receives a packet re-transmits that packet exactly once. Although the flooding technique ensures coverage, the technique is inefficient and causes broadcast storm problems. Two common routing protocols include Ad-Hoc On-Demand Distance Vector (AODV), and Optimized Link State Routing (OLSR). The AODV routing protocol is a reactive protocol that intends to alleviate the overhead problem associated with numerous packet transmissions, and utilizes HELLO packets or messages to determine node connectivity. During a route discovery phase, network nodes exchange periodic HELLO messages with their neighbors in order to establish a list of neighbors at each node. The HELLO packet includes the transmitting node address, a list of neighbors, and the status of links to the neighbors. By way of example, the neighborhood of a node A refers to all nodes that are linked to node A. The links may be symmetric or asymmetric.

The Optimized Link State Routing (OLSR) protocol employs a concept referred to as a two-hop neighbor. For example, a node C is considered to be a two-hop neighbor of node A, if a node B is a symmetric neighbor of node A, and node C is a symmetric neighbor of node B, but node C is not a neighbor of node A. The HELLO packets are utilized by the nodes to generate the immediate and two-hop neighbors, and to determine the quality of the communication links in the neighborhood. This information is stored for a limited time in each node, and needs to be refreshed periodically.

In a route maintenance phase, each network node surveys the link status to neighboring nodes. The HELLO packets are used to maintain connectivity between neighboring nodes, where a link is assumed to be disabled when no HELLO packet is received within a specified time interval. Several network protocols have been proposed to alleviate the overhead problem associated with the numerous packet transmissions of flooding. The OLSR protocol uses a multipoint relay (MPR) mechanism, where each network node uses the two-hop neighbor information to select a minimal set of multipoint relays (MPRs) to enable all nodes within a two-hop neighbor area to be reachable. The MPR flooding mechanism is also used to broadcast topology information throughout the network. Each network node with one or more associated multipoint relays (e.g., a non-empty MPR selector set) periodically transmits a topology control message including the address of the source node and the node multipoint relays (MPRs), thereby announcing node connectivity to node MPRs. Since each node has associated MPRs (e.g., an MPR selector set), the connectivity to all network nodes is announced, and each node receives a partial topology graph of the entire network. The shortest path algorithm is subsequently applied to this partial graph to calculate optimal routes to all nodes. The topology information is maintained for a specified time interval, and needs to be refreshed periodically.

However, the neighbor discovery and network formation aspects of the commercial protocols for Mobile Ad-Hoc networks (MANETs) described above are not suitable for tactical or other types of applications. For example, these types of applications or networks require severe timing constraints and security features. Further, the neighbor discovery protocols described above may need to adapt to asymmetrical links, and the HELLO packets are rather large, thereby significantly increasing bandwidth overhead. In addition, the above described protocols do not provide maintenance of time-synchronization throughout both neighbor discovery and network formation operations, while the many redundant transmissions in the protocols can cause broadcast storms through contention and collisions at the Medium Access Control (MAC) protocol layer.

SUMMARY

According to a present invention embodiment, network formation in wireless networks is enhanced based on control of network formation packet transmissions (e.g., Packet Radio Organizational Packet (PROP) transmissions). A source-initiated approach controls re-transmission of inquiry/reply PROP packets based on the presence of a neighboring node. The re-transmission provides neighbors or upstream nodes of a network node an opportunity to reply to a PROP packet prior to the network node constructing a new PROP packet (e.g., with large and constantly changing neighbor lists). This reduces the size and amount of PROP packets transmitted during neighbor discovery. In addition, the source-initiated approach controls PROP re-transmission of packets indicating a change in an upstream or control type node (e.g., LNC PROP). In this case, the node determines the presence of steady-state conditions (e.g., maintenance of conditions for the original LNC PROP transmission), and enables a single re-transmission of the LNC PROP packet, thereby reducing the transmission of unnecessary or duplicate LNC PROP packets (e.g., containing substantially the same information as previously transmitted packets since conditions have remained the same).

The above and still further features and advantages of the present invention will become apparent upon consideration of the following detailed description of example embodiments thereof, particularly when taken in conjunction with the accompanying drawings wherein like reference numerals in the various figures are utilized to designate like components.

BRIEF DESCRIPTION OF THE DRAWINGS

FIG. 4 is a block diagram of an example network node.

DETAILED DESCRIPTION OF EXAMPLE EMBODIMENTS

The present invention embodiments provide an efficient and reliable packet transmission protocol for the establishment of bi-directional communication links between network nodes and, subsequently, network formation within wireless networks.

Figure 1:
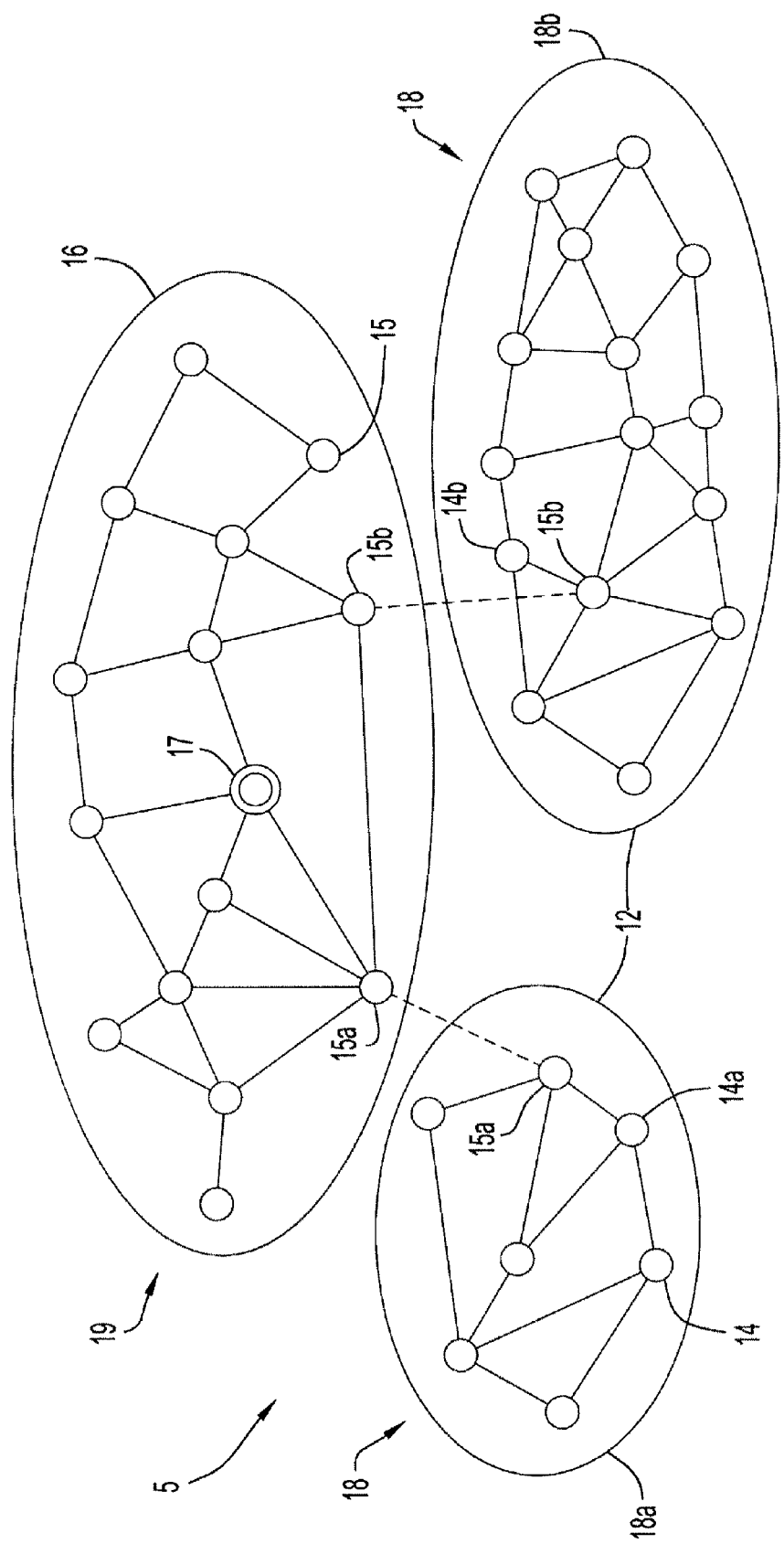
FIG. 1 is a diagrammatic illustration of an example communication network for a plural tier, plural hop domain.

Initially, networking services may be provided for various domains, including plural tier, plural hop networks, single tier, plural hop networks, and tree based networks. An example plural tier, plural hop network is illustrated in FIG. 1. Specifically, a wireless network 5 includes a two-tier architecture, where each tier includes one or more self-contained multi-hop sub-networks or islands 18, 19. Each island 18 is in the form of a flat multi-hop network and includes corresponding island member nodes 14 with one of those member nodes designated as an island head node 15. This type of island arrangement forms a lower tier 12 of network 5, and facilitates communication within an island between the island head and member nodes and between the member nodes themselves. Island 19 includes head nodes 15 of each island that are in communication with each other and form a backbone network or an upper network tier 16. Island 19 similarly includes a head node 15 designated as an upper tier or island head node 17. In order to limit the size of an island, the maximum number of members in an island is controlled by the island head node. A solid line between two radios or nodes within FIG. 1 indicates that the two radios or nodes are in direct communication, while a dotted line between upper and lower tier nodes indicates that the two radios or nodes are physically interconnected within the same node (e.g., the node within upper tier 16 or island 19 also serves as a head node 15 within a lower tier 12 or corresponding island 18).

Nodes in the same tier can communicate with one another within an island (or group of nodes). However, member nodes within different islands typically utilize upper tier nodes or island heads to relay messages and communicate. The backbone network facilitates communications between nodes of different islands (e.g., generally providing communications over greater distances). For example, a node 14a from a first lower tier island 18a desires to transmit a message to node 14b of a second lower tier island 18b. Node 14a transmits the message to a corresponding head node 15a of the first island that utilizes upper tier 16 (or island 19) of network 5 to forward the message to a head node 15b of the second island. Head node 15b subsequently forwards the received message to destination node 14b. Alternatively, nodes 14 may be arranged to form a network including a single or any quantity of tiers. Nodes within each island may use the source-initiated protocols according to a present invention embodiment as described below to form a network around the island head (e.g., designated or self promoted). Island member nodes must wait to hear from the corresponding head node for network formation.

Figure 2:
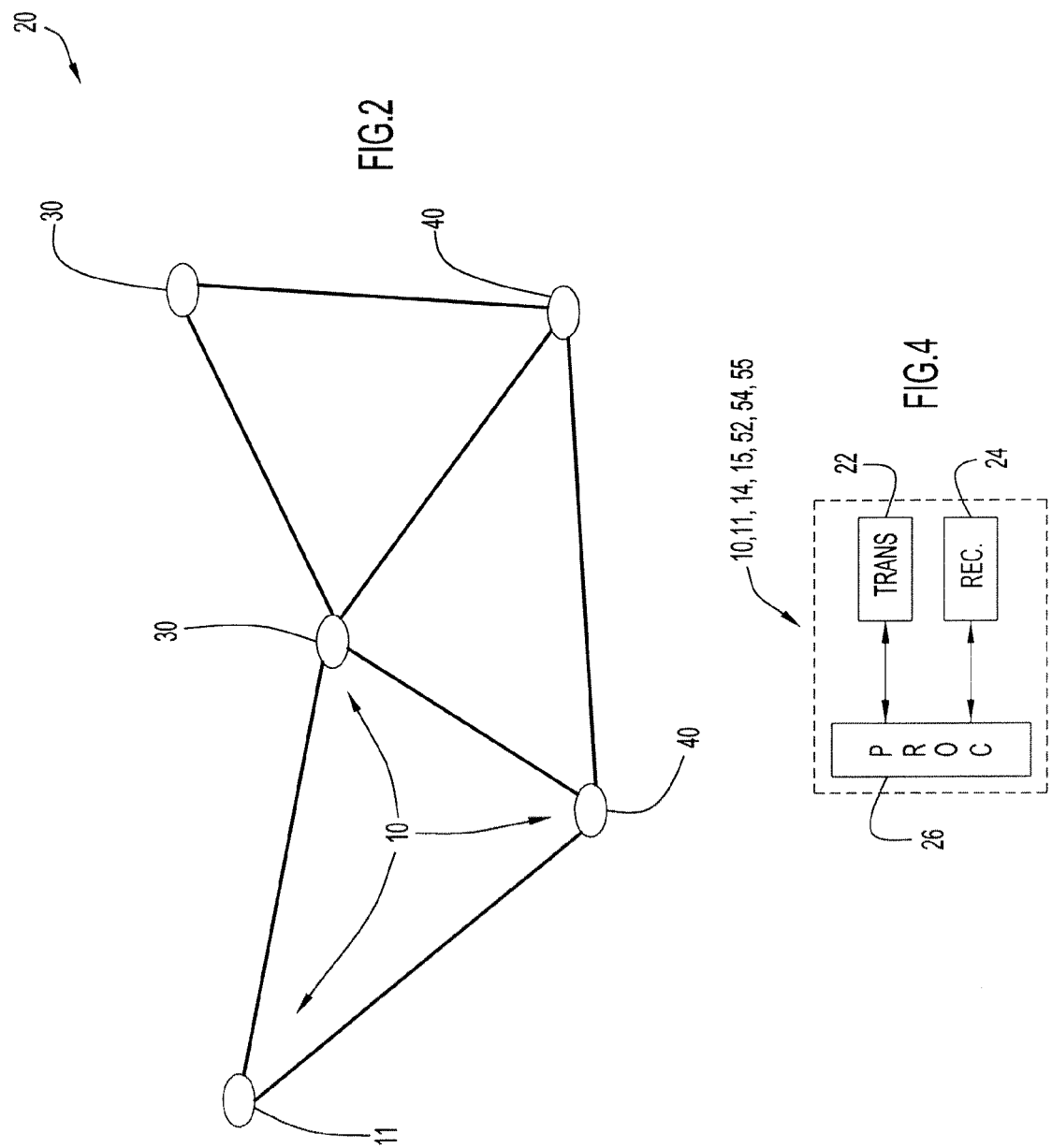
FIG. 2 is a diagrammatic illustration of an example communication network for a single tier, plural hop domain.

An example single tier, plural hop network is illustrated in FIG. 2. Initially, this type of network does not need an island head to start the network formation process. Specifically, a wireless network 20 includes a plurality of nodes 10, and is typically in the form of a flat, multi-hop network (e.g., analogous to an island). A portion of network nodes 10 may serve as source nodes 30 providing image and other data, while other network nodes 10 may serve as destination nodes 40 to receive transmitted data from the source nodes. In addition, one of the network nodes 10, preferably a destination node 40, is designated as a controller node 11 (e.g., analogous to an island head node). The controller node allocates and releases resources for communications between source and destination nodes, where nodes 11, 30 and/or 40 may serve to relay traffic. The nodes may alternatively form a network of any quantity of tiers.

Figure 3:
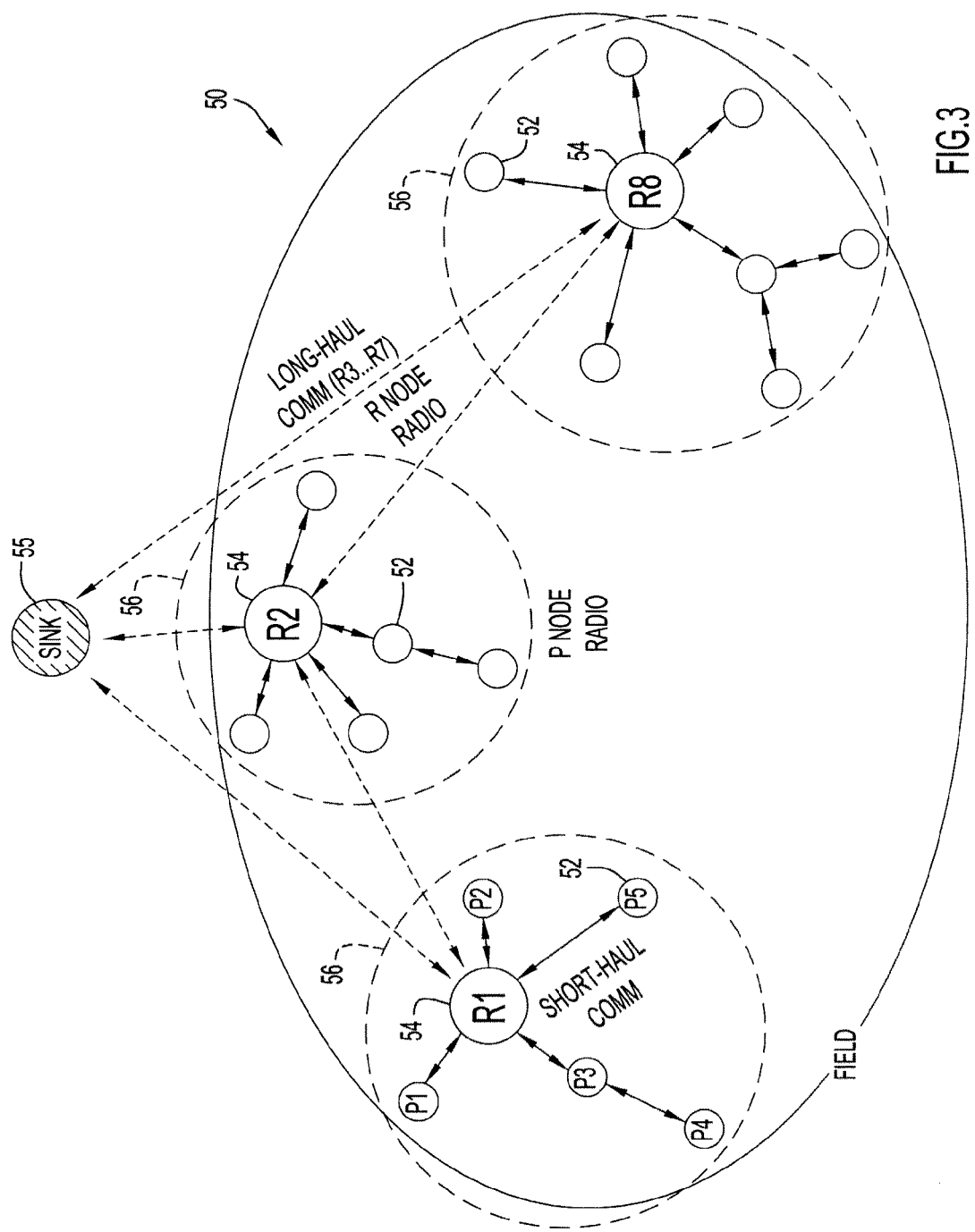
FIG. 3 is a diagrammatic illustration of an example communication network for a tree based domain.

An example tree based network is illustrated in FIG. 3. Initially, this type of network provides communication links to forward data to a sink node for processing. In particular, a network 50 includes field nodes 52 (e.g., P Nodes as viewed in FIG. 4), gateway nodes 54 (e.g., R Nodes as viewed in FIG. 4), and a sink node 55 (e.g., SINK as viewed in FIG. 4). Field nodes 52 are deployed within field or groups 56, where the field nodes are located in proximity (e.g., less than 400 meters) to each other. Field nodes 52 within a group 56 form a multi-hop network using radios configured for short-haul communications. Each field further includes gateway node 54 configured for long-haul communications and used to forward data to sink node 55.

Field nodes 52 may perform various data gathering tasks. This data is available from a number of field nodes 52 and is transmitted to a common gateway node 54. Gateway node 54 in each group 56 is responsible for gathering and processing the data from the group field nodes, where the gateway node provides the networking to forward the data to sink node 55. If the distance between the control node and the nearest gateway node exceeds the maximum RF range, additional gateway nodes 54 may be used to relay the data (e.g., FIG. 11 employing short haul and long haul gateway nodes).

In addition to the information reported by field nodes 52, gateway nodes 54 may further gather data to enhance the information received from the field nodes. The architecture of the network is a tree structure with sink node 55 as the root of the tree, and the formation of the network is self-organized without centralized intervention. The sink node (or other designated node) initiates the self-organizing network formation. The tree-based network architecture takes advantage of the fact that the field nodes are relatively static and, therefore, do not require frequent routing updates. When a group 56 awakens, and sink node 55 is not present, a gateway node 54 assumes the role of network time synchronization and the root or sink node of the tree-based network (e.g., referred to as the autonomous operation).

A network node of the various networks described above is illustrated in FIG. 4. Specifically, nodes 10, 11, 14, 15, 52, 54, and 55 each include a transmitter 22, a receiver 24, and a processor 26. The node may further include other components in accordance with a particular application (e.g., sensors or other data gathering devices in the case of field node 52 or gateway node 54, etc.). The processor is preferably implemented by a conventional microprocessor or controller and controls the node to transmit and receive messages in accordance with the protocols described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver forwards the received signals to processor 26 for processing. The node further includes an identification (ID) (e.g., a code or identification number) to identify the particular node and a database (not shown) to store information pertaining to neighboring nodes to facilitate reservations and/or routing. The identifier is unique to each node and preferably pre-assigned (e.g., a serial number or an identification number).

The networks preferably employ a link-state type of routing protocol. The database of each node maintains information enabling that node to determine appropriate paths for routing messages through the network. The information typically relates to links between the various network nodes. The node databases are synchronized in accordance with the routing protocol by transference of database update packets or messages (e.g., link state advertisements (LSAs)) between nodes that provide network connectivity information. In addition, each node periodically broadcasts a beacon type (e.g., HELLO) or neighbor discovery packet. This packet advertises the presence of a node within the network, and is typically utilized by nodes for "keep alive" and neighbor discovery purposes.

With respect to network formation within the above described domains, HELLO packets are used to determine bi-directional communication links, link maintenance, and time synchronization throughout operation. The packet size of HELLO messages (e.g., 57 bits) is identical to that of Request to Send (RTS) and Clear to Send (CTS) control messages (e.g., of the Carrier Sense Multiple Access/Collision Avoidance (CSMA/CA) protocol). Once a prospective neighbor node has been detected via HELLO or other control messages (e.g., RTS and CTS), the link layer sends a Packet Radio Organizational Packet (PROP) message to the prospective neighbor node to determine the bi-directional RF communication link (or bi-directional link). The periodic HELLO packet is suppressed when the local node generates any control messages (e.g., RTS or CTS). This relatively small size of HELLO packets reduces drastically the contention and collision problem of the Mobile Ad-Hoc networks (MANETs) described above.

A Packet Radio Organizational Packet (PROP) message contains header information including the sending node MAC address, operational domains (e.g., plural tier/plural hop, single tier/plural hop, or tree based), ratio status (e.g., single or dual channel), the ID of the sending node island head/controller (or upstream node for tree based networks), cost-to-island head/controller (or upstream node for tree based networks), number-of-hops-to-island head/controller (or upstream node for tree based networks), and the sending node link status. A network node builds a list of nodes from which the node desires to receive a PROP. The list is derived from the node neighbor table. The node broadcasts the PROP header including the neighbor list (e.g., referred to as an inquiry PROP). When a PROP is received with the node in the inquiry list, the node broadcasts a reply (e.g., referred to as a reply PROP) and an inquiry list (e.g., if the list exists). Once a PROP is received with the node in the reply list, the sending node is placed in the neighbor table as bi-directional and the node network information is updated to the network protocol layer to start the network formation process.

When no control messages (e.g., HELLO, RTS and CTS) are received from a neighbor node for a configurable time interval, the neighbor node is removed from the bi-directional neighbor table, and the network is updated to clear the removed node from a network formation database. A re-route process is subsequently performed.

With respect to the plural tier/plural hop and single tier/plural hop domains, when an unaffiliated node (or node disjoined from the network) receives a Packet Radio Organizational Packet (PROP) message from a neighbor node, the unaffiliated node collects network formation information pertinent to all neighboring nodes. A neighbor discovery timer is initiated prior to commencing network formation. Upon expiration of the neighbor discovery timer, the unaffiliated node starts the affiliation process of the network. The network for the plural tier/plural hop domain is composed of localized networks or islands as described above (FIG. 1). Each island includes an island head node selected from the island member nodes and identified by the Medium Access Control (MAC) layer address of the island head node. In order to improve the scalability of the network, routing information of each island is only distributed within that island.

The general strategy for network formation is to initially establish the island head node, and have the island network form around the established island head. Nodes that are not currently affiliated with an island always attempt to first join an existing island (unless configured otherwise). In order to begin the affiliation process, the unaffiliated or joiner node must send a join request to the island head of the selected island. However, since the joiner node includes neighbor node information, but does not yet have internal routing information about the new island, the join request must be forwarded by a neighbor node that is an existing island member. The selected neighbor node acts as a proxy and relays the join request to the island head node. If the island head node accepts the joiner node, the joiner node forms an adjacency with the proxy node and network routing database information is exchanged by the link state update.

The network for single tier/plural hop domain includes source nodes providing image and other data, and destination nodes to receive transmitted data from the source nodes, where a destination node is designated as a controller node as described above (FIG. 2). Since there is no island head node in the single tier/plural hop domain, each network node starts to establish the network formation after the link layer neighbor discovery protocol identifies and reports bi-directional links with neighbor nodes to the network layer. The topology database exchange between the joiner node (or unaffiliated node joining the network) and neighbor nodes is substantially similar to that of the plural tier/plural hop domain described above.

The network for a tree based domain includes nodes arranged in groups or fields, one or more gateway nodes for each field, and a sink node as described above (FIG. 3). The network for the tree based domain provides communication links to forward node derived data to the sink node for processing. A tree based domain network includes a tree-based network architecture, where the sink node is always the root of the networking tree (e.g., there is only one sink node for each tree based network). The sink node initiates network-time throughout the tree based domain operation (e.g., sleep or wake-up process). Each remaining node in the networking tree (other than the sink node) is associated with an upstream node that attaches the node to the tree. In addition, each node in the networking tree is the root of a sub-tree including that node and the nodes downstream from that node. Leaf (or terminal) nodes have no downstream neighbor nodes.

The tree based network formation makes use of Packet Radio Organizational Packet (PROP) messages to convey the following critical network information to bi-directional neighbor nodes of a network node:
1. MAC address of the upstream node of the network node;
2. MAC address of the sink node;
3. The number-of-hops between the network node and sink node; and
4. The cost to the sink node for the network node.

Once an unaffiliated node (with a network formation database that does not contain any sink node information) receives the PROP packet from a neighbor node that contains the upstream node and sink node ID (or MAC address), the unaffiliated node starts the neighbor discovery timer to collect the most available upstream node candidates. In order to select the most appropriate neighbor node as the upstream node candidate, the network formation filters each neighbor node in a network formation table with a criteria formula.

When the upstream node is selected, the unaffiliated node sends a join request to the selected node, and waits to receive a join accept message from the upstream node. The topology database exchange process is substantially similar to those of the plural tier/plural hop and single tier/plural hop domains described above.

The network domains each include a neighbor discovery protocol (e.g., broadcast of PROP packets or messages) and an affiliation process as described above. The various network domains (e.g., plural tier/plural hop, single tier/plural hop, and tree based) generally encompass the possible candidates of tactical and other networks. The sending node transmits a Request to Send (RTS) message (e.g., CSMA/CA protocol) in a reservation channel prior to broadcasting the PROP packet. The neighbor discovery protocol generates the over-the-air (OTA) PROP message to verify bi-directional RF communication with external nodes and to exchange network-level network formation information.

The network formation protocol is mostly driven by inputs from link layer neighbor discovery. When control messages (e.g., HELLO, Request to Send (RTS), and Clear to Send (CTS)) are received, the neighbor discovery in the link-layer starts bi-direction link establishment with the sending node of the control messages. HELLO messages include the same packet size as RTS and CTS packets (whereas the conventional HELLO format in Mobile Ad-Hoc networks (MA-NETs) consists of additional information, such as neighbor list and status, which may be symmetric or asymmetric). HELLO messages are used to detect the neighbor nodes and for time-synchronization throughout operation. When a network node does not receive any over-the-air (OTA) messages for a while (e.g., this occurs frequently in the tree based domain), the network node network time loses time-synchronization with neighbor nodes. Thus, periodic HELLO packet transmission maintains the network time-synchronization intact.

Figure 5:
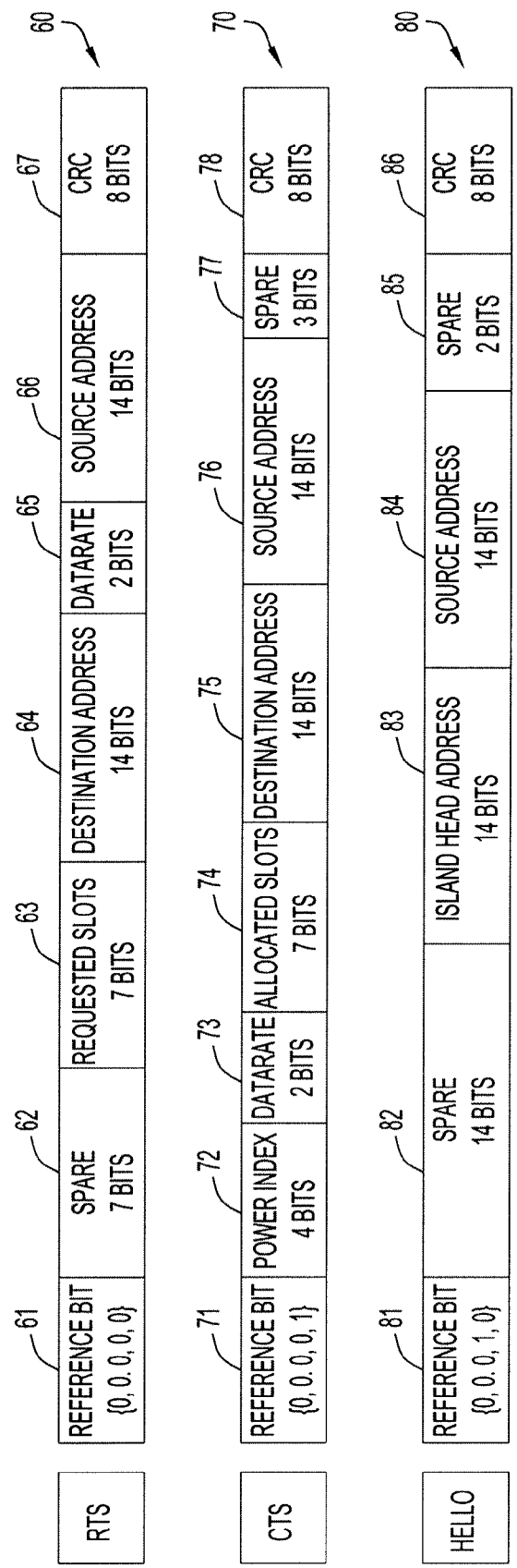
FIG. 5 is a block diagram of an example format of control messages (e.g., RTS, CTS, and HELLO) to detect neighbor nodes.

An example format of control messages (RTS, CTS, and HELLO) to detect neighbor nodes is illustrated in FIG. 5. Specifically, a Request to Send (RTS) packet 60 includes a reference field 61 (e.g., 5 bits), a spare or extraneous field 62 (e.g., 7 bits), a requested slot field 63 (e.g., 7 bits), a destination address field 64 (e.g., 14 bits), a data rate field 65 (e.g., 2 bits), a source address field 66 (e.g., 14 bits), and a Cyclic Redundancy Check (CRC) field 67 (e.g., 8 bits). The reference field identifies the type of packet, while the spare field contains extraneous bits within the packet. The requested slot field is utilized to request time slots for communications, and the destination and source address fields respectively provide the destination and source for the packet. The data rate field indicates the data rate, while the CRC field is utilized for error checking.

A Clear to Send (CTS) packet 70 includes a reference field 71 (e.g., 5 bits), a power index field 72 (e.g., 4 bits), a data rate field 73 (e.g., 2 bits), an allocated slot field 74 (e.g., 7 bits), a destination address field 75 (e.g., 14 bits), a source address field 76 (e.g., 14 bits), a spare or extraneous field 77 (e.g., 3 bits), and a Cyclic Redundancy Check (CRC) field 78 (e.g., 8 bits). The reference field identifies the type of packet, while the power field indicates a power level for transmission. The data rate field indicates the data rate, and the allocated slot field is utilized to indicate the time slots allocated for communications. The destination and source address fields respectively provide the destination and source for the packet. The spare field contains extraneous bits within the packet, while the CRC field is utilized for error checking.

A HELLO packet 80 includes a reference field 81 (e.g., 5 bits), a first spare or extraneous field 82 (e.g., 14 bits), an island head field 83 (e.g., 14 bits), a source address field 84 (e.g., 14 bits), a second spare or extraneous field 85 (e.g., 14 bits), and a Cyclic Redundancy Check (CRC) field 86 (e.g., 8 bits). The reference field identifies the type of packet, while the first and second spare fields contain extraneous bits within the packet. The island head and destination address fields respectively provide the address of the island head/controller (or upstream node for tree based networks) for the sending node and the destination for the packet. The CRC field is utilized for error checking.

Figure 6A:
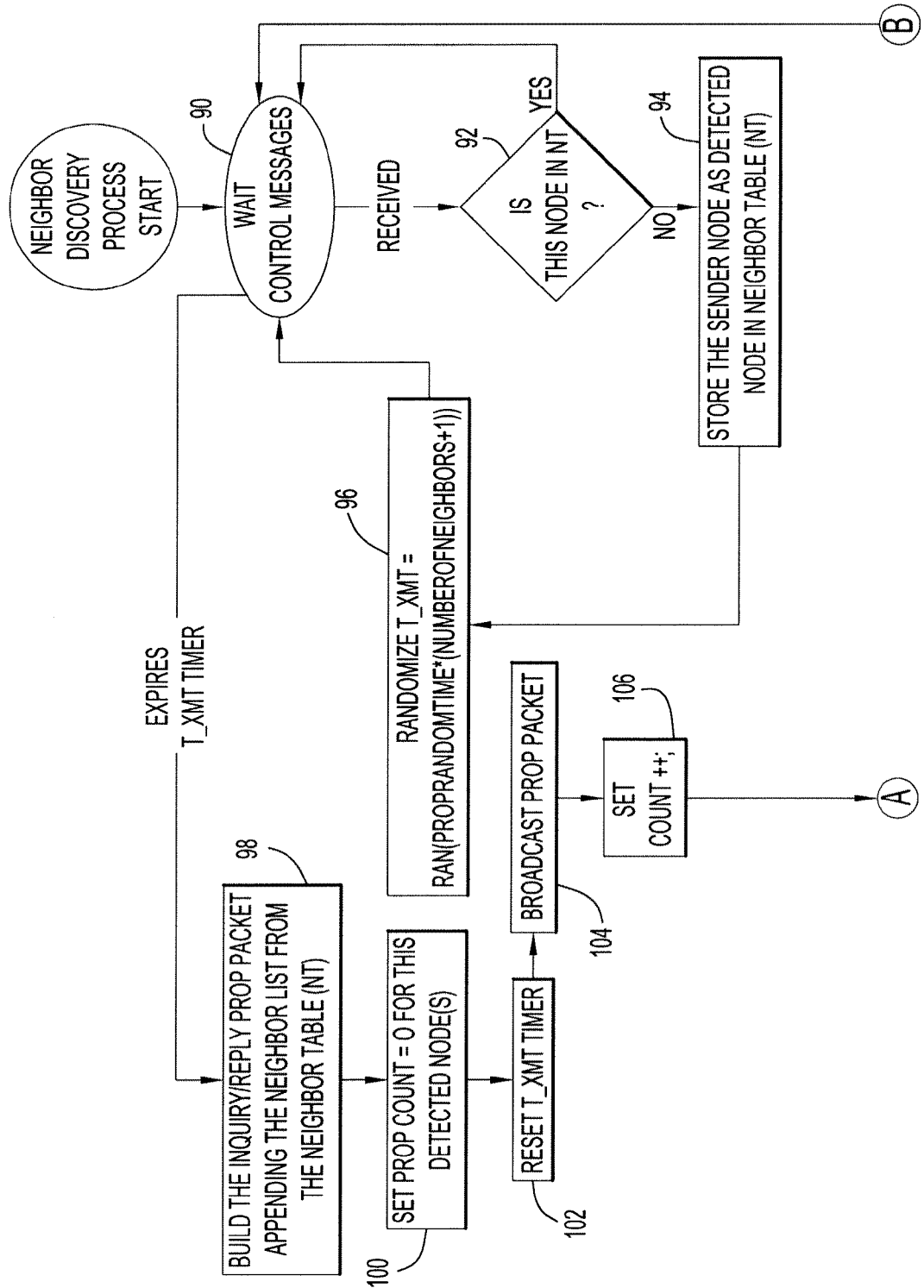
FIGS. 6A-6B are a procedural flowchart illustrating the manner in which neighbor discovery is performed by a network node in accordance with a source-oriented scheme.
Figure 6B:
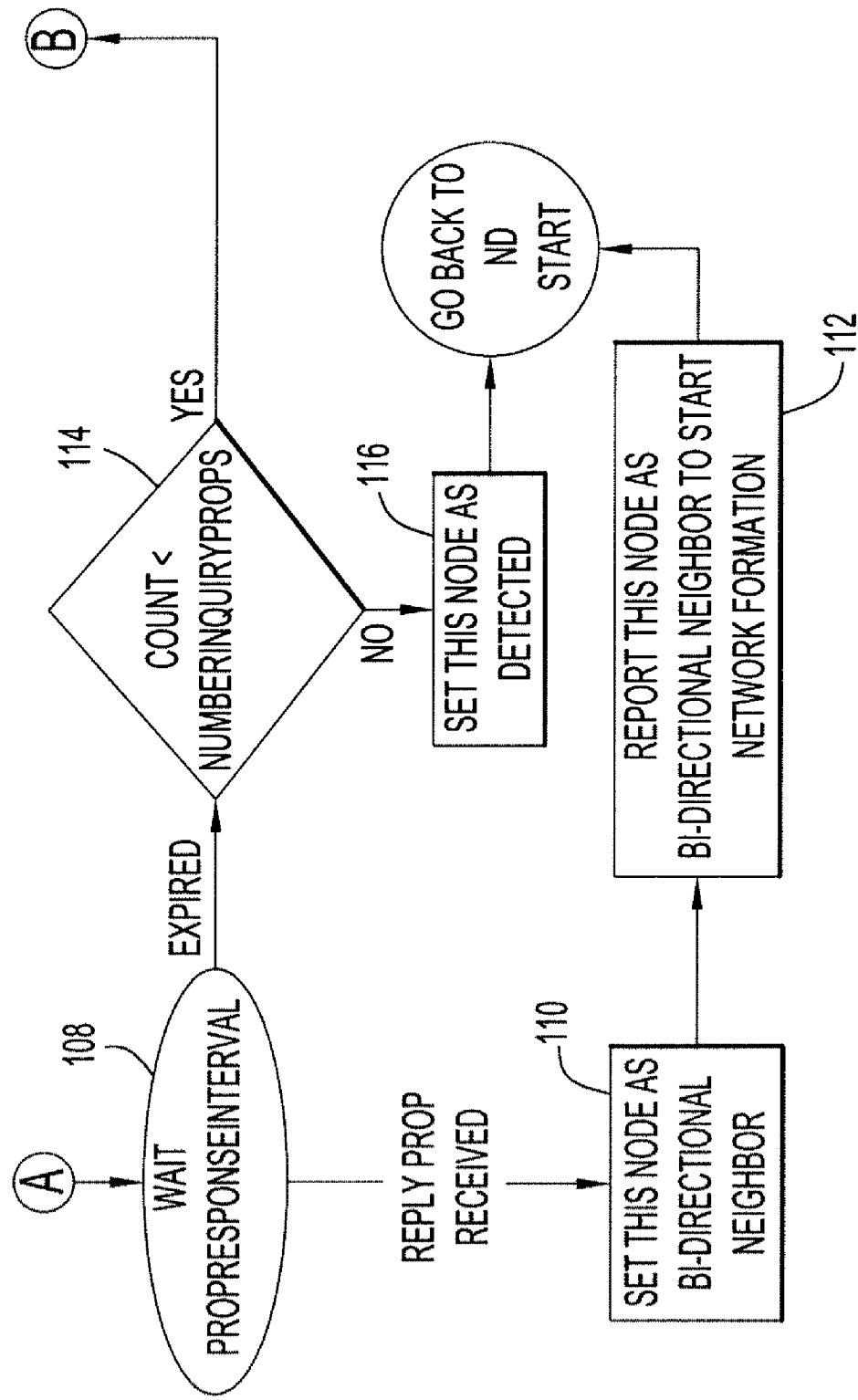

When an unaffiliated node receives network information for a neighbor node, the unaffiliated node begins a neighbor discovery timer prior to the start of the network formation process. This timer allows time for completion of the network formation process to enable the node to find the best upstream node candidate selection (tree based domain) and adjacency node candidate selection (plural tier/plural hop domain). However, no timer is needed for the single tier/plural hop domain to start the affiliation process. The manner in which neighbor discovery is performed by a network node (e.g., plural tier/plural hop, single tier/plural hop, tree based) in accordance with a source-oriented scheme is illustrated in FIGS. 6A-6B. Initially, the network node typically performs neighbor discovery via processor 26 (FIG. 4). Specifically, a network node initially waits for reception of control messages (e.g., RTS, CTS, or HELLO) from neighboring nodes at step

90. When a node receives a control message (e.g., RTS, CTS, or HELLO) from an unknown neighbor node through a reservation (or broadcast) channel, the node determines the presence of the neighbor node in a neighbor table. If the neighbor node is present in the neighbor table as determined at step 92, the node returns to step 90 and waits for additional control messages as described above.

If the neighbor node is absent from the neighbor table as determined at step 92, the node places the neighbor node with a detected state in the neighbor table at step 94 to start the bi-directional neighbor discovery. The node sets a randomized timer (e.g., T_xmt as viewed in FIG. 6A) at step 96. The randomized timer is preferably set to a time interval based on a random selection from a range derived from a product of a random time and one more than the quantity of neighbors (e.g., time interval=Randomize function (PROPRandomTime*(Number of Neighbors+1))). The randomized timer is based on the number of bi-directional links in order to avoid collision of broadcast PROP packets. The network node subsequently returns to step 90 to wait for additional control messages as described above.

Upon expiration of the randomized timer (e.g., T_xmt timer as viewed in FIG. 6A), the network node builds a PROP packet header (e.g., for an inquiry or reply PROP packet) at step 98 including the node MAC address and network formation information. The network formation information includes a list of one or more nodes (e.g., using the node MAC addresses as identifiers). Each MAC address in the list is associated with a flag indicating the type of PROP packet (e.g., an inquiry PROP for a response or a reply PROP to a previous inquiry PROP from a far node).

A counter for the number of PROPS for detected neighbor nodes is initialized at step 100, and the random timer is reset at step 102. The neighbor discovery protocol maintains counters and timers for each neighbor node from the start of the neighbor discovery process. The constructed PROP packet is broadcasted at step 104, and the PROP counter is incremented at step 106. A response to the PROP packet must arrive within a predetermined time period (e.g., PROPResponseInterval as viewed in FIG. 6B) or within a predetermined number of attempts (e.g., NumberInquiryPROPs as viewed in FIG. 6B). Each of these parameters are pre-configured. Expiration or violation of any one of these parameters may render the neighbor discovery to be unsuccessful. Accordingly, the node waits for a response at step 108 until expiration of the predetermined time period. When the time period expires, the PROP count is compared to the number of attempts at step 114. If the count or number of attempts equals or exceeds the attempts parameter (e.g., NumberInquiryPROPs as viewed in FIG. 6B), the node remains in the detected state at step 116 and neighbor discovery is repeated. When the count or number of attempts is less than the attempts parameter (e.g., NumberInquiryPROPs as viewed in FIG. 6B), the node returns to wait for control messages from neighboring nodes at step 90 as described above.

Once a reply is received within the predetermined period in response to the PROP broadcast, the neighbor node is set as a bi-directional neighbor node at step 110, and the neighbor node is reported to the network layer as a bi-directional neighbor node to the network layer at step 112 to start network formation. The node subsequently repeats the neighbor discovery process. Thus, a successful bidirectional exchange of PROP packets demonstrates the viability of an RF communication link. When critical network-level information (e.g., the information differs for each domain) is received via PROP messages, the network formation process starts to join the existing network (or island head), and forms route adjacencies. The topology information is flooded through the adjacency routes. The optimum routes to reach each node are determined by a shortest path algorithm.

When an island head/controller ID and/or upstream node ID (tree based domain) is changed, the network layer broadcasts new network formation information via a local node change (LNC) PROP message that contains only the PROP header. When neighbor nodes receive a broadcast local node change PROP (LNC PROP), the nodes update LNC PROP information in the network formation table in order to start the affiliation process. Thus, the reception of LNC PROPs is very critical for robust network formation. The general strategy in the plural tier/plural hop network formation is to establish an island head, where the island forms the routing adjacencies around the established island head as described above. The single tier/plural hop network formation starts the routing adjacency process immediately upon reception of bi-directional links from the link-layer. In the tree based domain, the sink node is the root of the tree-based network architecture. Each node in the networking tree (other than the sink node) is associated with an upstream node that attaches that node to the tree, where each node in the tree is the root of a sub-tree including that node and all corresponding downstream nodes as described above.

The network formation information updated from the network layer is used to determine broadcasting of an LNC PROP (without a neighbor list) to neighbor nodes. The following critical parameters of the domains from the updated network formation information are compared with existing parameter values of those domains for the determination:

Plural Tier/Single Tier Domain Parameters
1) Island head/Controller ID
2) Partition ID
3) Community of Interest (COI)
4) Island/Network Size
Tree Based Domain Parameters
1) Sink node ID (or MAC address)
2) Cost to the sink node
3) Hops to the sink node
4) Upstream node ID (or MAC address)

Figure 7:
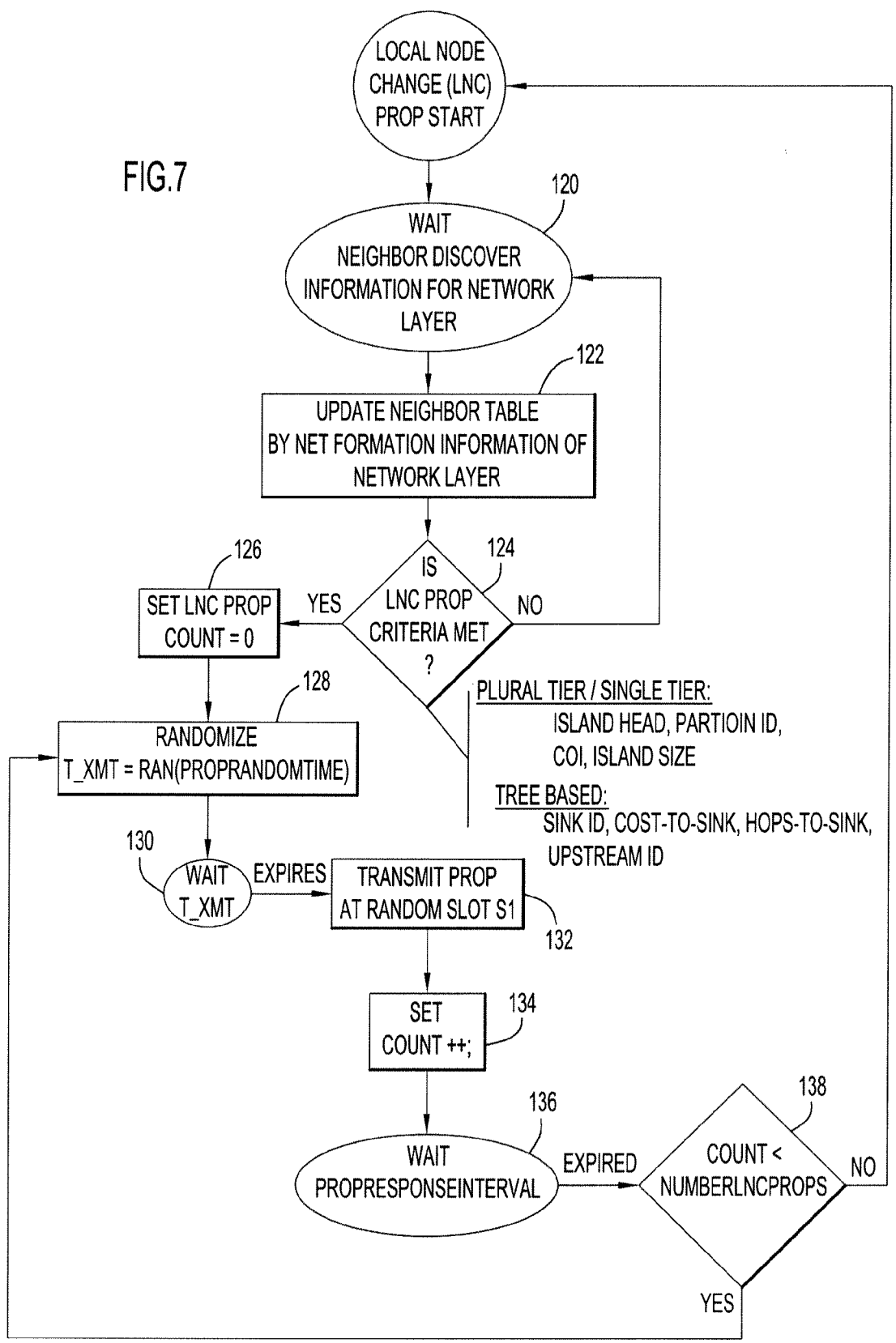
FIG. 7 is a procedural flowchart illustrating the manner in which a network node transmits a local node change in accordance with a source-oriented scheme.

The manner in which a network node (e.g., plural tier/plural hop, single tier/plural hop, tree based) transmits the local node change in accordance with a source-oriented scheme is illustrated in FIG. 7. Initially, the network node typically performs LNC PROP transmission via processor 26 (FIG. 4). Specifically, the network node waits for neighbor discovery information for the network layer at step 120, and subsequently updates the neighbor table based on the network formation information of the network layer at step 122. The network node compares the updated information with the existing parameters at step 124 to determine the presence of conditions for broadcasting an LNC PROP. If one or more of the parameters for the plural tier/single tier domains (e.g., Island Head/Controller ID, Partition ID, Community of Interest and Island/Network Size) and tree based domain (e.g., Sink node ID, Cost to sink node, Hops to sink node, and Upstream Node ID) changed, a counter for the number of PROPs (e.g., LNC PROP Count as viewed in FIG. 7) is initialized at step 126 and a randomized timer (e.g., T_xmt as viewed in FIG. 7) is set at step 128.

The node waits for expiration of the randomized timer at step 130 and transmits the LNC PROP within a random time slot at step 132. The PROP counter is incremented at step 134. A response to the LNC PROP packet must arrive within a predetermined time period (e.g., PROPResponseInterval as viewed in FIG. 7) or within a predetermined number of attempts (e.g., NumberLncPROPs as viewed in FIG. 7). Each of these parameters are pre-configured. The network node waits for a response at step 136 until expiration of the predetermined time period. When the time period expires, the PROP count is compared to the number of attempts at step 138. If the count or number of attempts equals or exceeds the attempts parameter (e.g., NumberLncPROPs as viewed in FIG. 7), the network node repeats the LNC PROP transmission process described above. When the count or number of attempts is less than the attempts parameter (e.g., NumberLncPROPs as viewed in FIG. 7), the network node returns to set and wait for the randomized timer at steps 128 and 130 to re-transmit the LNC PROP packet as described above.

The PROP packets utilize a broadcast mechanism to reach all neighbor node candidates generally with maximum power and minimum data rate. The PROP exchange protocols described above employ the source-oriented schemes. In other words, if the sender of the PROP packet does not receive a response within the pre-configured time interval (e.g., PROPResponseInterval), the sender re-transmits the PROP packet until the pre-configured number of attempts (e.g., NumberInquiryPROPs) is reached (FIGS. 6A-6B and 7). The pre-configured values of the number of attempts (e.g., NumberInquiryPROPs for the inquiry/reply PROP and NumberLncPROPs for LNC PROPs) may be pre-selected (e.g., default values are preferably NumberInquiryPROPs=3 and NumberLncPROPs=1). The fixed values for these parameters may generate unnecessary over-the-air (OTA) PROP packets, or cause unsuccessful neighbor discovery.

Thus, the source-oriented approaches described above employ a sufficiently large number of PROP packet transmissions to ensure that neighbor nodes establish a bi-directional link at the link layer and start the network formation process. This number of PROP packet transmissions is fixed throughout the entire operation. However, depending on parameter settings and scenarios, the source-oriented approach may use either an excessive or inadequate number of PROP transmissions. The source-oriented approach is further passive in terms of re-transmission of the inquiry PROP packet since the network node waits for a timer expiration to receive the reply PROP packet for the configured number of attempts or re-transmissions. This passive PROP transmission scheme may not be reliable to determine bi-directional RF communication links because the pre-configured parameters (e.g., PROPResponseInterval and NumberInquiryPROPs) are fixed for the domain operation cases (e.g., sparse, dense, stable or dynamic environments).

Accordingly, the source-oriented scheme described above employs a "pure stop and wait" protocol approach. The sender node waits for a reply to a transmitted PROP packet from designated neighbor node(s) for the pre-configured time interval (e.g., PROPResponseInveral) after the inquiry PROP packet transmission. If a reply PROP packet is not received, a new inquiry PROP packet with a new neighbor list (e.g., if there are new detected neighbors) is constructed and re-transmitted for the configured amount of attempts (e.g., NumberInquiryPROPs).

Initially, an unaffiliated or isolated node does not have any bi-directional RF communication links (e.g., referred to as an "Out-Of-Net" status). When a node has a bi-directional link for the plural tier/plural hop and single tier/plural hop domains (or an upstream node for the tree based domain), the node attains an "In-Net" status. If the unaffiliated ("Out-Of-Net") node starts to process neighbor discovery, a large amount of PROP packets are generated by the unaffiliated node and corresponding neighbor nodes (e.g., regardless of "In-Net" status). During this transient period (e.g., of "Out-Of-Net" status), the neighbor list and status (inquiry or reply) in the PROP packet are changing dynamically, and the source-oriented PROP approach described above does not expedite neighbor discovery, but rather, impedes neighbor discovery due to large over-the-air (OTA) PROPs increasing contention and collisions in the MAC layer. Further, since the inquiry/reply PROP packet with the neighbor list is built and transmitted upon the expiration of a randomized timer, the source-oriented PROP approach described above may be improved in efficiency.

The present invention embodiments improve upon the above described source-oriented approaches to expedite setting of the bi-directional node-to-node communication link (link layer), and to enhance reliability of inter-node communication in the course of the network formation process. In other words, the present invention embodiments provide an efficient and reliable PROP packet transmission protocol for the establishment of bi-directional communication links and the network formation process.

Figure 8A:
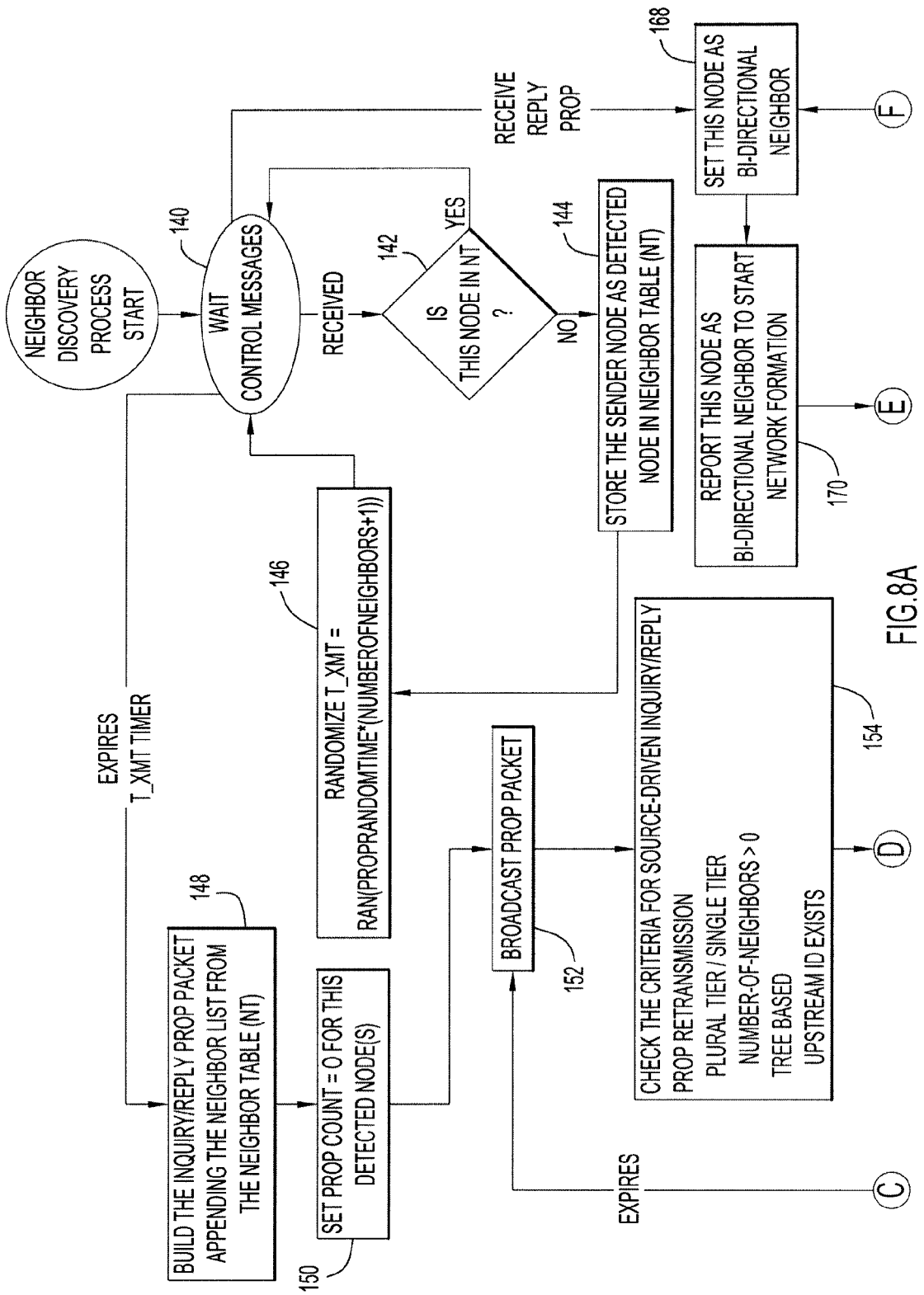
FIGS. 8A-8B are a procedural flowchart illustrating the manner in which neighbor discovery is performed by a network node based on a source-initiated scheme according to an embodiment of the present invention.
Figure 8B:
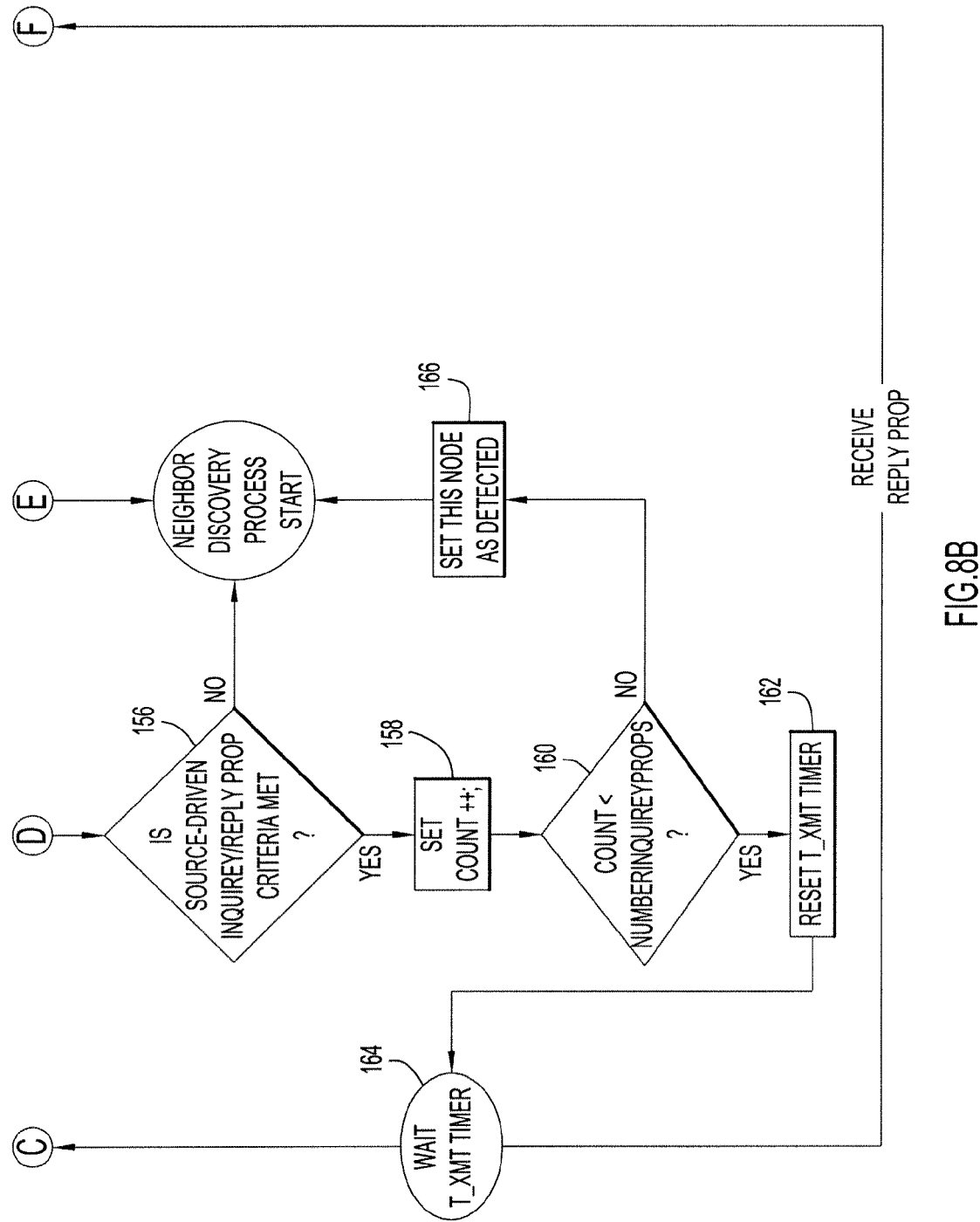

A present invention embodiment enables a sender node to transmit an inquiry/reply PROP packet once at the expiration of the randomized timer (e.g., T_xmt) during an "Out-of-Net" status, and process the PROP packet in a manner similar to that of the source-oriented approach described above (FIGS. 6A-6B) for an "In-Net" status. The manner in which neighbor discovery is performed by a network node (e.g., plural tier/plural hop, single tier/plural hop, tree based) employing a source-initiated approach for PROP re-transmission according to an embodiment of the present invention is illustrated in FIGS. 8A-8B. Initially, the network node typically performs neighbor discovery via processor 26 (FIG. 4). Specifically, a network node initially waits for reception of control messages (e.g., RTS, CTS, or HELLO) from neighboring nodes at step 140. When a node receives a control message (e.g., RTS, CTS, or HELLO) from an unknown neighbor node through a reservation (or broadcast) channel, the node determines the presence of the neighbor node in a neighbor table. If the neighbor node is present in the neighbor table as determined at step 142, the node returns to step 140 and waits for additional control messages as described above.

If the neighbor node is not in the neighbor table as determined at step 142, the node places the neighbor node with a detected state in the neighbor table at step 144 to start the bi-directional neighbor discovery. The node sets a randomized timer (e.g., T_xmt as viewed in FIG. 8A) at step 146. The randomized timer is preferably set to a time interval based on a random selection from a range derived from a product of a random time and one more than the quantity of neighbors (e.g., time interval=Randomize function (PROPRandomTime*(Number of Neighbors+1))). The randomized timer is based on the number of bi-directional links in order to avoid collision of broadcast PROP packets. The network node subsequently returns to step 140 to wait for additional control messages as described above.

Upon expiration of the randomized timer (e.g., T_xmt as viewed in FIG. 8A), the network node builds a PROP packet header (e.g., for an inquiry or reply PROP packet) at step 148 including the node MAC address and network formation information. The network formation information includes a list of one or more nodes (e.g., using the node MAC addresses as identifiers). Each MAC address in the list is associated with a flag indicating the type of PROP packet (e.g., an inquiry PROP for a response or a reply PROP to a previous inquiry PROP from a far node).

A counter for the number of PROPS for detected neighbor nodes is initialized at step 150. The neighbor discovery protocol maintains counters and timers for each neighbor node from the start of the neighbor discovery process. The constructed PROP packet is broadcasted at step 152, and criteria for re-transmission of the PROP packet is examined at step 154. In particular, the PROP packet may be re-transmitted when the status of the node is "In-Net" or, in other words, the node has at least one neighbor node (plural tier/plural hop and single tier/plural hop domains) or an upstream node (tree based domain). If the node has an "Out-of-Net" status or, in other words, is an unaffiliated or isolated node without neighbors (plural tier/plural hop and single tier/plural hop domains) or an upstream node (tree based domain), the neighbor discovery process is repeated and a new PROP packet may be constructed for transmission.

A node is considered to have an "In-Net" status in response to being associated with at least one neighbor node (e.g., plural tier/plural hop and single tier/plural hop domains), or an upstream node (e.g., tree based domains). The node ascertains the quantity of neighbor nodes (plural tier/plural hop and single tier/plural hop domains), or the presence of an upstream node ID (tree based domain) to determine the node status at step 154. When a node does not meet the criteria for re-transmission of the PROP packet (e.g., "Out-of-Net" status) as determined at step 156, the neighbor discovery process is repeated as described above and a new PROP packet is constructed for transmission.

If the node meets the criteria for re-transmission of the PROP packet (e.g., "In-Net" status) as determined at step 156, the PROP counter is incremented at step 158. The PROP count is compared to the number of attempts at step 160. When the count or number of attempts is less than the attempts parameter (e.g., NumberInquiryPROPs as viewed in FIG. 8B), the randomized timer is reset at step 162. Since the node is determined to have at least one neighbor node (plural tier/plural hop and single tier/plural hop domains) or an upstream node (tree based domain), the node waits for expiration of the randomized timer at step 164. When the randomized time period expires, the PROP packet is re-transmitted at step 152 and the process repeats as described above until the number of attempts equals or exceeds the attempts parameter (e.g., NumberInquiryPROPs as viewed in FIG. 8B) as determined at step 160. In this case, the node remains in the detected state at step 166, and neighbor discovery is repeated and a new PROP packet may be constructed for transmission as described above. This enables faster re-transmission of the PROP packet since the node does not wait for a reply within an additional time period, but rather, simply re-transmits upon expiration of the randomized timer (without receiving a reply).

If a reply is received in response to the PROP broadcast within the randomized time period, the neighbor node is set as a bi-directional neighbor node at step 168, and the neighbor node is reported to the network layer as a bidirectional neighbor node at step 170 to start network formation. The node subsequently repeats the neighbor discovery process. Thus, a successful bi-directional exchange of PROP packets demonstrates the viability of an RF communication link. When critical network-level information (e.g., the information differs for each domain) is received via PROP messages, the network formation process starts to join the existing network (or island head), and forms route adjacencies. The topology information is flooded through the adjacency routes. The optimum routes to reach each node are determined by a shortest path algorithm.

Thus, the sender node transmits the inquiry/reply PROP packet once at the expiration of the randomized timer during an "Out-of-Net" status, and re-transmits the current PROP packet in an "In-Net" state. In other words, the source-initiated neighbor discovery provides known neighbors or upstream nodes of a network node an opportunity to reply to a PROP packet prior to constructing a new PROP packet (e.g., with large and constantly changing neighbor lists). This reduces the size and amount of PROP packets transmitted during neighbor discovery.

With respect to the LNC PROP transmissions, once the link layer reports the neighbor information with the bi-directional neighbor nodes to the network layer, the network formation procedure updates the network formation database and waits for the critical network formation information. When a network node attains an "In-Net" status initially, the critical neighbor information (e.g., island head/controller ID (plural tier/plural hop and single tier/plural hop domains) and upstream node (tree based domain) is not available. The network formation procedure in the network layer waits for this critical information which is updated by the reception of LNC PROP packets from neighbor nodes. Upon receiving this critical information in the LNC PROP packet, the node starts the neighbor discovery timer, and begins a collection of neighbor information. This process continues until the expiration of the neighbor discovery timer. Once the timer expires, the node begins an affiliation (or join) process with the best possible neighbor node. Thus, missing the LNC PROP packet reception delays the affiliation (e.g., eventually routing adjacency) or causes the undesirable fragmented network.

In addition, when the network node receives an LNC PROP packet containing a different island head/controller/upstream node ID for the network node, the network formation starts to establish routing adjacencies with bi-directional nodes. If the network node misses the LNC PROP packets, network formation does not even start to send join messages to the existing network affiliation process. Accordingly, robust PROP packet transmission is essential to execute a reliable network formation (or affiliation) process for all scenarios.

During the transient period (e.g., "Out-of-Net" status), a node transmits a single LNC PROP packet. However, multiple LNC PROP packets are broadcasted when the critical neighbor information in the LNC PROP is not changed from the previous (steady-state) values. In order to reduce the LNC PROP transmissions, a present invention embodiment limits the multiple re-transmission to a single occurrence until the critical neighbor information in the LNC PROP packet is changed. This source-initiated PROP transmission approach prevents unnecessary over-the-air (OTA) PROP transmissions and enhances efficiency of network formation.

Figure 9A:
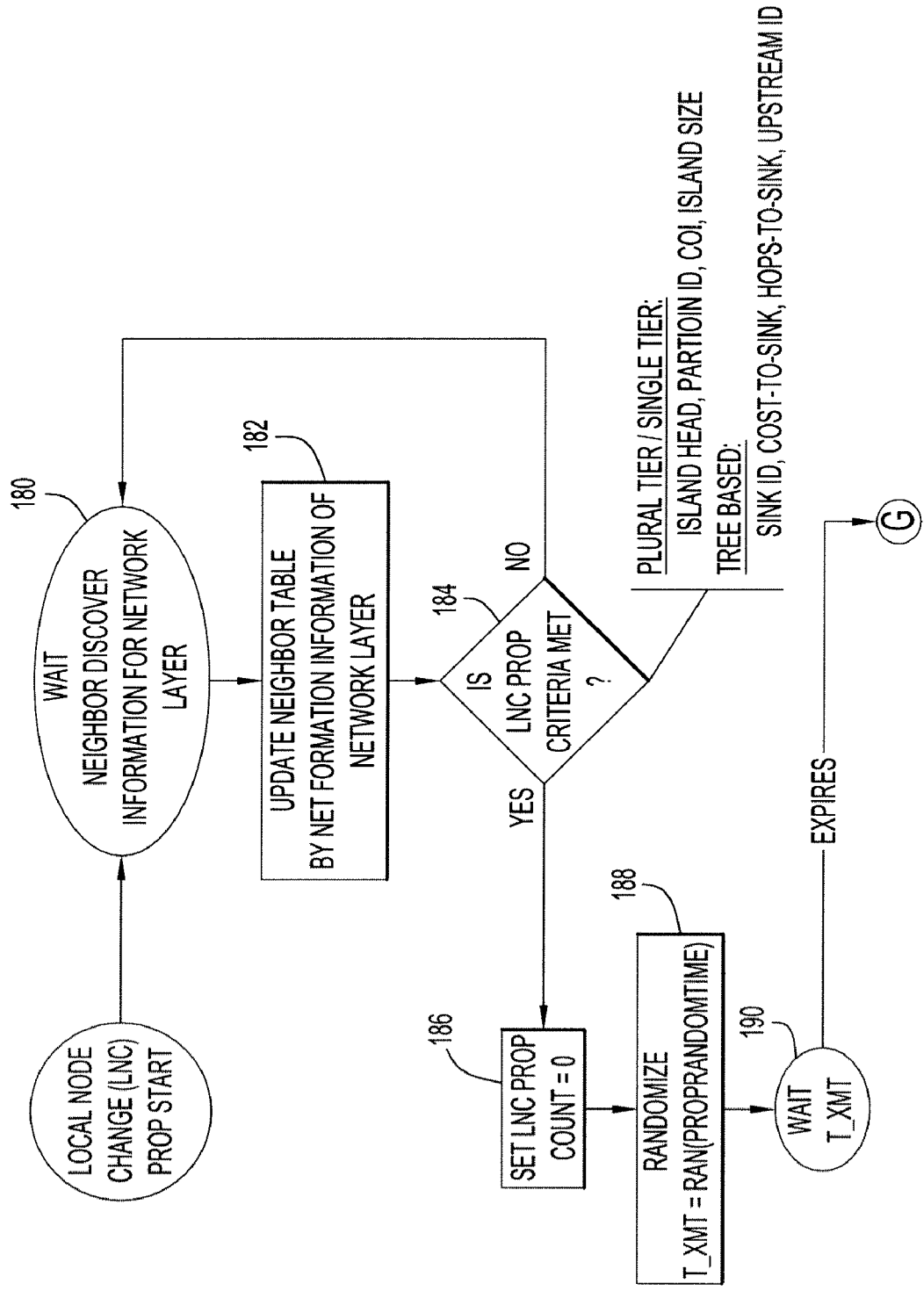
FIGS. 9A-9B are a procedural flowchart illustrating the manner in which a network node transmits a local node change based on a source-initiated scheme according to an embodiment of the present invention.
Figure 9B:
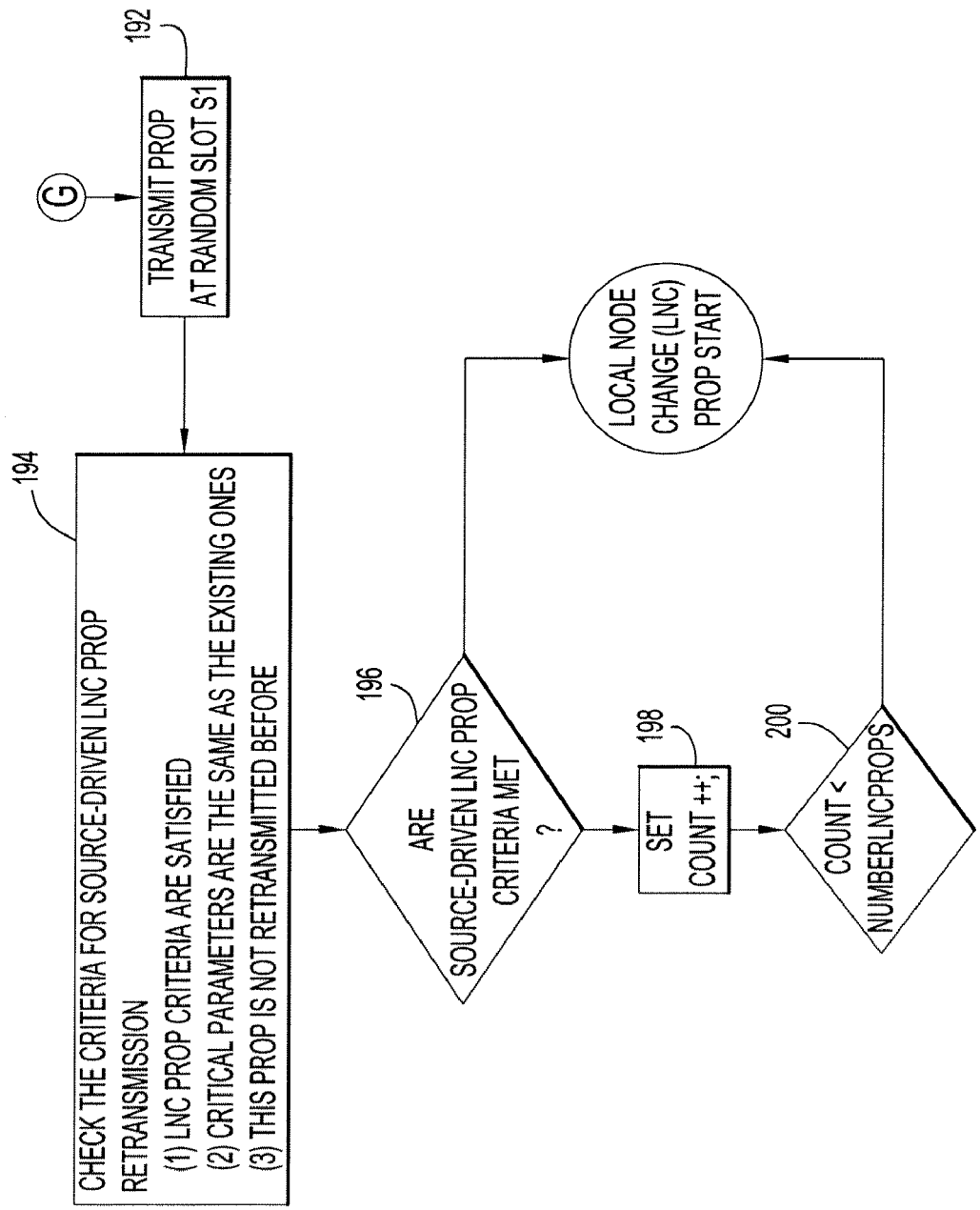

The manner in which a network node (e.g., plural tier/plural hop, single tier/plural hop, tree based) employs a source-initiated approach for transmitting the local node change according to an embodiment of the present invention is illustrated in FIGS. 9A-9B. Initially, the network node typically performs LNC PROP transmission via processor 26 (FIG. 4). Specifically, the network node waits for neighbor discovery information for the network layer at step 180, and subsequently updates the neighbor table based on the network formation information of the network layer at step 182. The network node compares the updated information with the existing parameters at step 184 to determine the presence of conditions for broadcasting an LNC PROP. If one or more of the parameters for the plural tier/single tier (e.g., Island Head/Controller ID, Partition ID, Community of Interest and Island/Network Size) and tree based (e.g., Sink node ID, Cost to sink node, Hops to sink node, and Upstream Node ID) domains changed, a counter for the number of PROPs (e.g., LNC PROP Count as viewed in FIG. 9A) is initialized at step 186 and a randomized timer (e.g., T_xmt as viewed in FIG. 9A) is set at step 188.

The node waits for expiration of the randomized timer at step 190 and transmits the LNC PROP within a random time slot at step 192. In order to limit transmissions of the LNC PROP packets, the node determines the presence of certain conditions at step 194 prior to enabling re-transmission of the PROP packet. Specifically, the node determines that: the conditions for initially broadcasting this LNC PROP packet described above are still present; the critical parameters for the plural tier/plural hop, single tier/plural hop and tree based domains have maintained their values or remain unchanged; and the LNC PROP has not been previously re-transmitted. If each of these conditions do not exist as determined at step 196, the LNC PROP transmission process is repeated as described above.

When the conditions for re-transmission exist as determined at step 196, the PROP counter is incremented at step 198, and the PROP count is compared to the number of attempts. If the count or number of attempts equals or exceeds the attempts parameter (e.g., NumberLncPROPs as viewed in FIG. 9B) as determined at step 200, the network node repeats the LNC PROP transmission process described above. When the count or number of attempts is less than the attempts parameter (e.g., NumberLncPROPs as viewed in FIG. 9B) as determined at step 200, the network node returns to set and wait for the randomized timer at steps 188 and 190 to re-transmit the LNC PROP packet as described above. This enables faster re-transmission of the LNC PROP packet since the node does not wait for a reply, but rather, re-transmits upon expiration of the randomized timer.

In other words, the node determines the presence of steady-state conditions (e.g., maintenance of conditions for the original LNC PROP transmission), and enables a single re-transmission of the LNC PROP packet in response to a steady-state condition, thereby reducing the transmission of unnecessary or duplicate LNC PROP packets and enhancing network formation. In addition, this source-initiated approach enables nodes to more quickly ascertain LNC PROP information since re-transmission of LNC PROP packets occurs faster (e.g., without needing to wait for a reply), and the absence of LNC PROP re-transmissions indicates a steady-state condition (e.g., indicating that no changes have occurred and the prior LNC PROP information received by the node is still current).

Alternatively, a present invention embodiment may employ a receiver-initiated approach to avoid unnecessary PROP re-transmissions and reduce the quantity of over-the-air (OTA) packets to enhance overall performance. When a network node does not receive an expected PROP packet (e.g., inquiry, reply, or LNC) prior to expiration of a reply interval, the receiving network node requests transmission of the expected PROP packets via an existing HELLO packet. For example, when a node becomes a neighbor and is waiting to receive an LNC packet, the node may request a neighbor to re-transmit an LNC packet if the expected packet is not received within expiration of a time period as described below.

Figure 10:
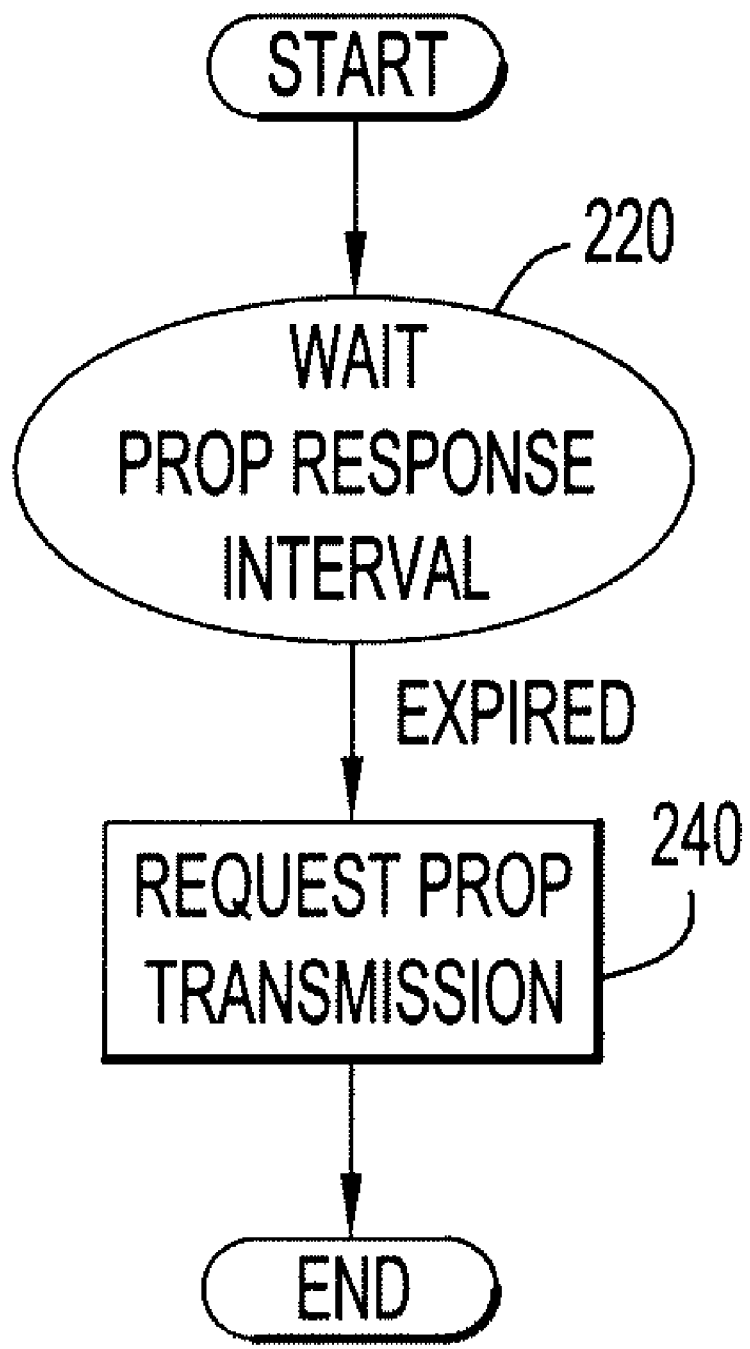
FIG. 10 is a procedural flowchart illustrating the manner in which a network node employs a receiver-initiated scheme for PROP packet transmission according to an embodiment of the present invention.

The manner in which a network node employs a receiver-initiated approach for PROP packet transmission is illustrated in FIG. 10. Initially, the network node performs the receiver-initiated approach via processor 26 (FIG. 4). Specifically, the network node waits for an expected PROP packet at step 220 until expiration of the predetermined time period (e.g., PropResponseInterval as viewed in FIG. 10). When the time period expires without reception of the expected PROP packet, the node requests re-transmission of the expected PROP packet via a HELLO message at step 240. In particular, second spare field 85 of the HELLO message (FIG. 5) may be used to indicate that the network node requests PROP re-transmission from a sending node, while first spare field 82 of the HELLO message (FIG. 5) may be used to specify the particular sending node (e.g., via a node address). By way of example, the following two-bit coding scheme may be employed to indicate the type of PROP packet requested.

1. {0,0}:noPROP
2. {0,1}:inquiryPROP
3. {1,0}:reply PROP
4. {1,1}:LNC PROP

For the case of no PROP {0, 0}, the normal HELLO packets provide the required functionality. Since the existing HELLO packet is used for receiver-initiated PROP re-transmission, this approach incurs no additional overhead.

The implementation of the receiver-initiated PROP request includes re-formatting the HELLO messages, the use of those HELLO packets by various functions (e.g., an automatic power transmission protocol (ATP)), and control of the receiver-initiated PROP request scheme throughout operations. The receiver-initiated approach may be combined in any manner with the source-oriented and source-initiated approaches for PROP transmission described above.

An example tree based network for analysis and comparison of network formation between the source-oriented (e.g., FIGS. 6A-6B and 7), source-initiated (e.g., FIGS. 8A-8B and 9A-9B), and receiver-initiated (e.g., FIG. 10) approaches described above is illustrated in FIG. 11. Initially, the network is for simulation purposes, directed toward the tree based domain, and includes ninety-eight nodes. The network includes a single sink node 300, and seven fields 302 including six fields each with fourteen nodes (e.g., Fields 1-6 as viewed in FIG. 11), and a single field with thirteen nodes (e.g., Field 7 as viewed in FIG. 11). Each field includes a long haul gateway node 304, and a short haul gateway node 306, where remaining nodes within a field are field nodes 308. Each long haul gateway node 304 of a field 302 has RF connectivity to a corresponding short haul gateway node 302 and to sink node 300. The long haul gateway node is located between the short haul gateway node and the sink node, but significantly closer to the short haul gateway node. A single channel is used for the simulation.

With respect to the network simulation, all network nodes are started randomly within ten seconds of the simulation start, where the simulation is executed ten times. Each simulation run includes a unique random seed, and a set of parameters pertaining to the number of attempts or transmissions (e.g., NumberInquiryPROPs (values of 1, 2 and 3) and NumberLncPROPs (values of 1, 2, and 3)). The network is simulated for a duration of one-hundred seconds. All nodes are enabled within ten seconds, and one-hundred seconds are allowed for network formation. The simulation is configured with default attributes without loss of generality since the following metrics are compared between the above described source-oriented, source-initiated, and receiver-initiated approaches:

1) Speed of the bi-directional RF links in the network;
2) All fields have an upstream node to the sink node; and
3) The number of PROP packets transmitted.

Figure 12:
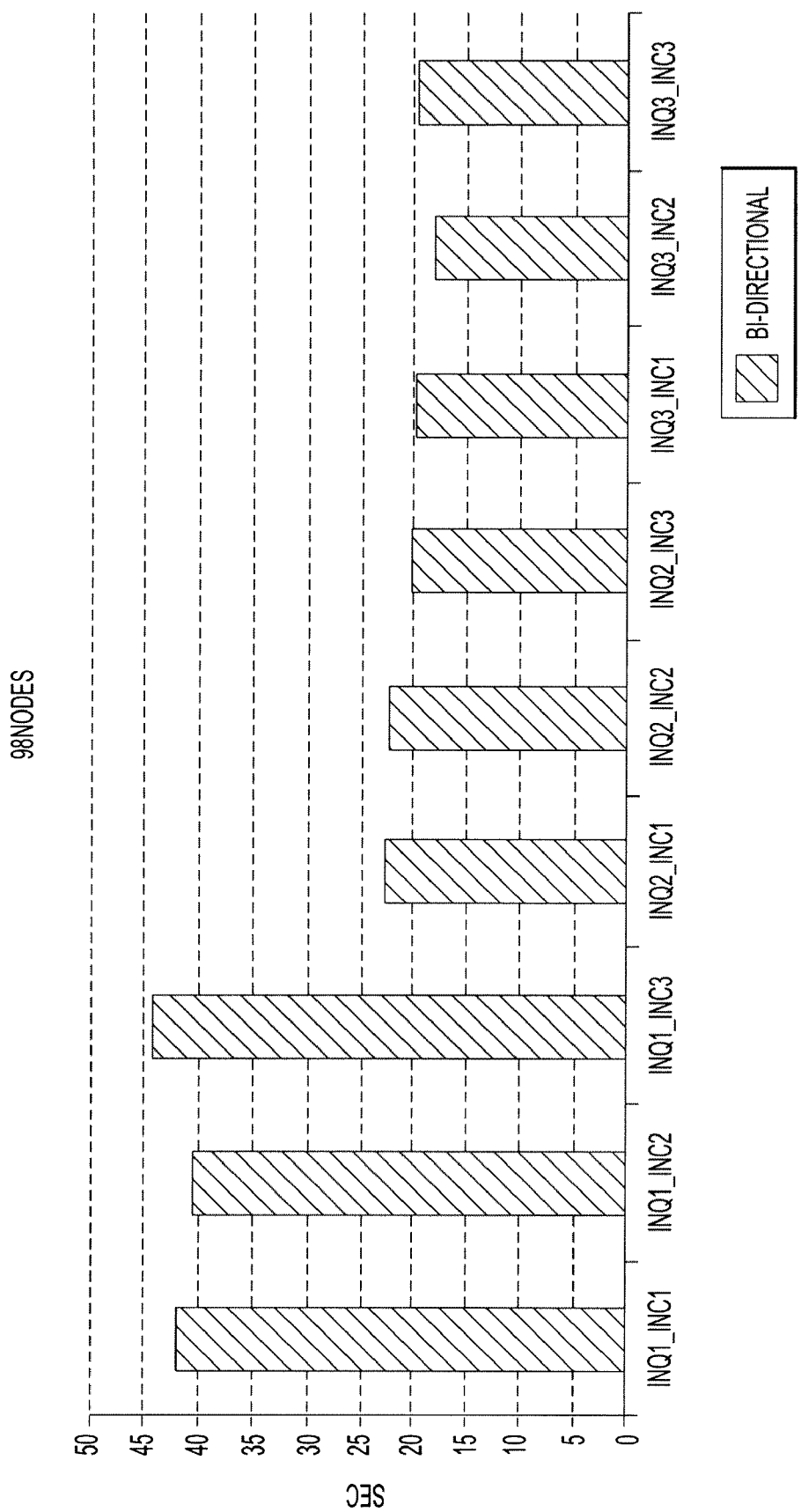
FIG. 12 is a graphical illustration of the bi-directional link completion time during simulation of the example network of FIG. 11.

As described above, each simulation run includes a unique random seed, and a set of parameters including the number of attempts for transmitting inquiry/reply and LNC PROP packets (e.g., NumberInquiryPROPs (e.g., values of 1, 2 and 3) and NumberLncPROPs (values of 1, 2, and 3)). The nodes record completion time of the bi-direction link with all neighbors. The bi-directional link completion time for the source-oriented approaches (e.g., FIGS. 6A-6B and 7) is averaged over ten runs and illustrated in FIG. 12 (e.g., where inq1, inq2, and inq3 represent the inquiry/reply PROP parameter settings (values of 1, 2, and 3) for NumberInquiryProps, and lnc1, lnc2, and lnc3 represent the parameter settings (values of 1, 2, and 3) for NumberLncProps). The source-oriented inquiry/reply PROP scheme with the higher parameter setting for inquiry/reply PROP packets (inq3, or NumberInquiryPROPs=3) performs better than the lower parameter setting (inq1, or NumberInquiryPROPs=1) since the maximum number of PROP packets for this scenario to achieve the bi-directional link is less than three, and the inquiry/reply PROP exchange is stopped as soon as the bi-directional link is achieved (e.g., in most cases less than three attempts). However, this value of the maximum PROP packets must increase for the dense network scenario. The source-oriented approaches select fixed values of the parameters (e.g., NumberInquiryPROPs and NumberLncPROPs) over the entire simulation. Thus, the source-initiated and receiver-initiated PROP request protocols enable more reliable network formation than the source-oriented approaches.

Figure 11:
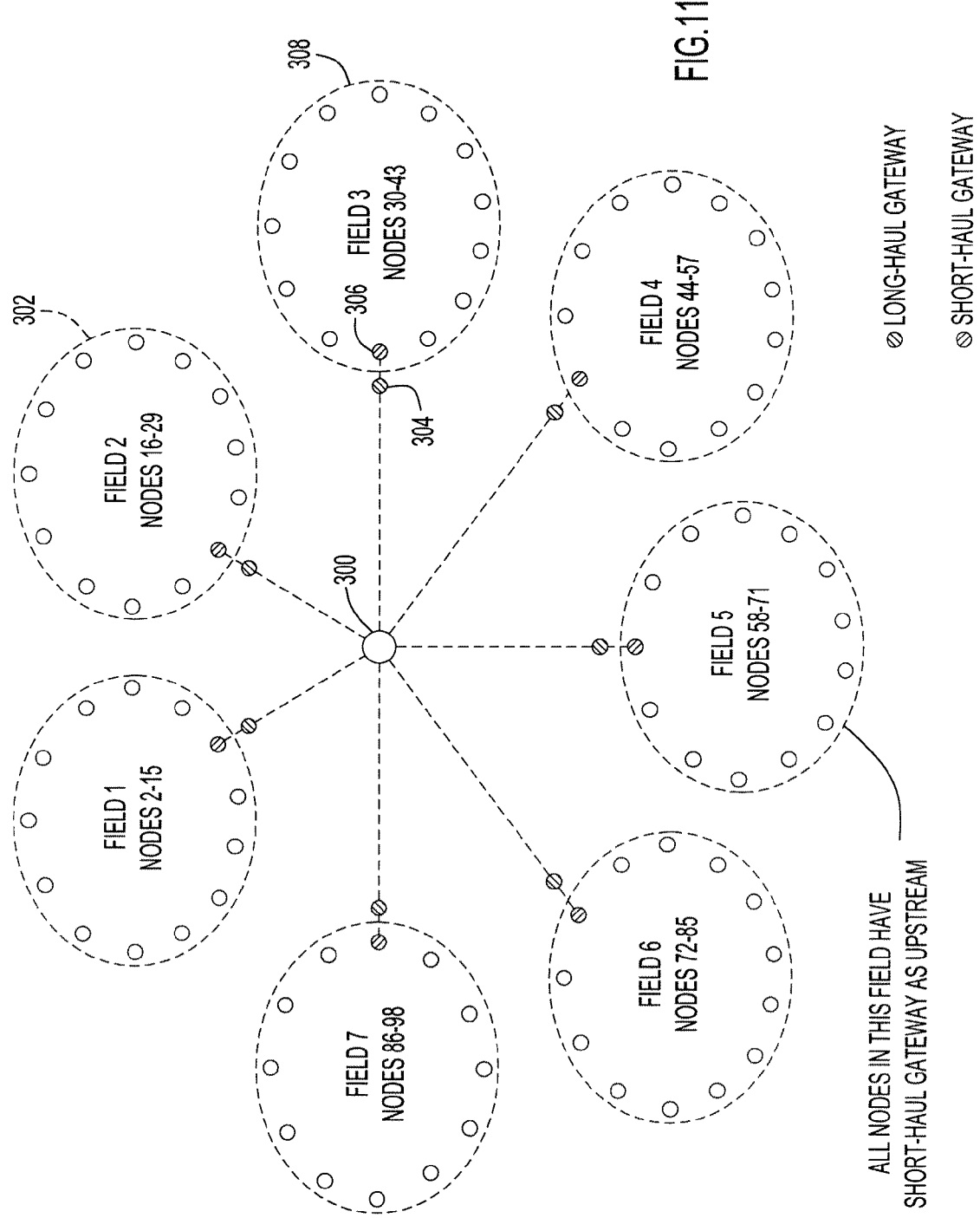
FIG. 11 is a diagrammatic illustration of an example tree based network for analysis and comparison of network formation with respect to the source-oriented, source-initiated, and receiver-initiated schemes.

The completion time of adjacencies in network formation is not significantly different when varying the PROP parameters (e.g., NumberInquiryPROPs and NumberLncPROPs) in the example tree based network scenario (FIG. 11). However, the completion time of adjacency does not reveal the problem that some fields are totally isolated (or lost) without an upstream node. One or more fields 302 are isolated in 90% of total simulation runs with the lower parameter setting (e.g., NumberLncPROPs=1), and in 10% of simulation runs with the intermediate parameter setting (e.g., NumberLncPROPs=2). The higher parameter setting (NumberLncPROPs=3) yields no isolated fields. However, the lost-fields problem may occur more or less often depending upon the network scenario configuration.

Figure 13:
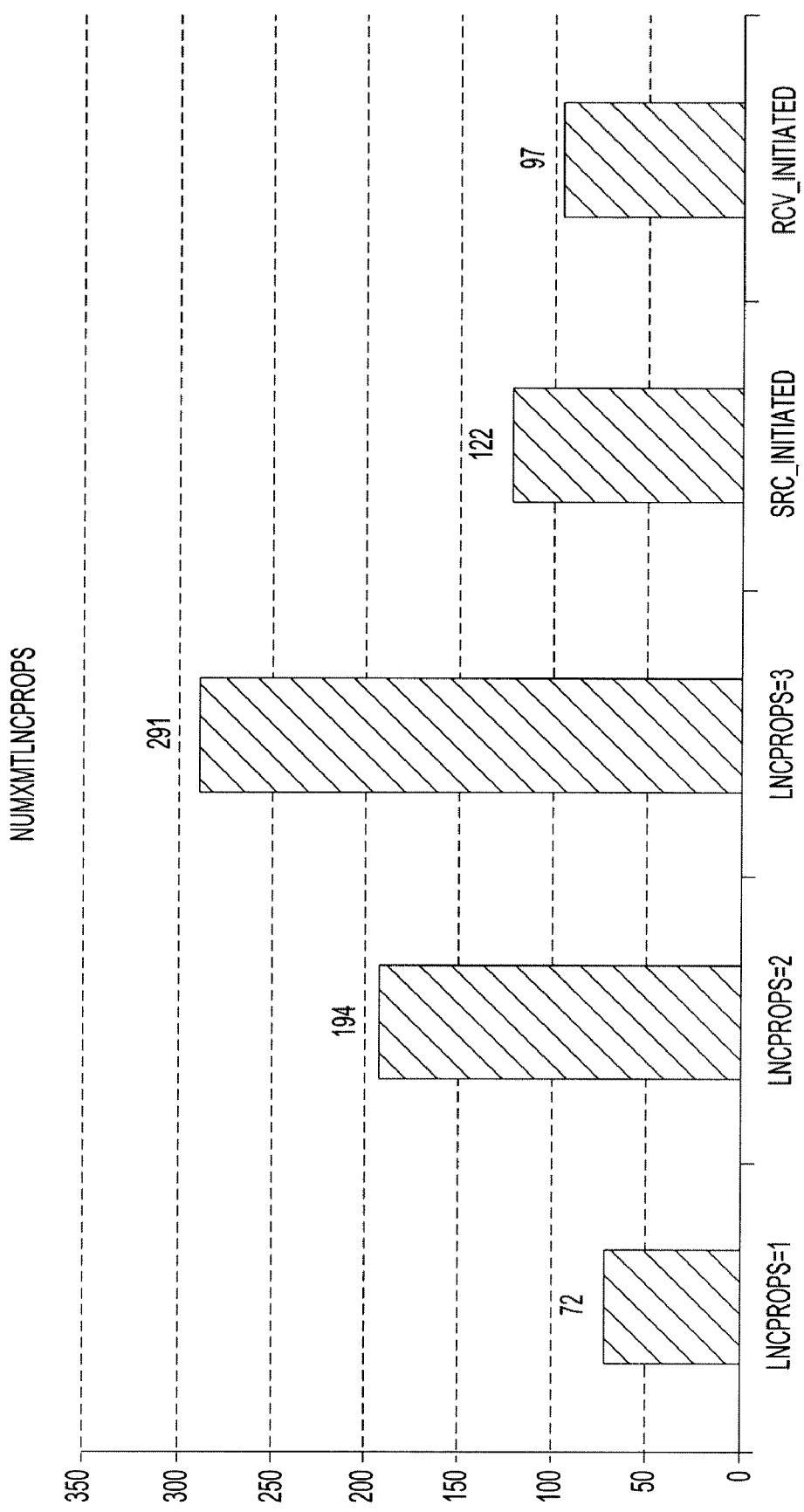
FIG. 13 is a graphical illustration of the quantity of LNC PROP packets transmitted during simulation of the example network of FIG. 11.

The total number of LNC PROP packets transmitted during the simulations for the various approaches is illustrated in FIG. 13. In particular, the quantity of LNC PROP packets transmitted for the source-oriented approach with the lower parameter setting (NumberLncPROPs=1) is less than (e.g., 72 packets in a simulation) the packets transmitted for the higher parameter settings (NumberLncPROPs=2 (194 packets) and 3 (291 packets)) since two fields are isolated, and no LNC PROP packets are generated. The source-initiated scheme generates two or more LNC PROP packets based on the source-initiated criteria. Approximately two LNC PROP packets are generated when upstream nodes in lost fields trigger the source-initiated LNC PROP transmission. However, the receiver-initiated PROP scheme requests an LNC PROP packet from the upstream node when the packet is not received within the predetermined time (PROPResponseInterval). Assuming the source-oriented approach selects the higher parameter setting (e.g., NumberLncPROPs=3) to avoid lost fields, the total number of PROP packet transmissions (e.g., NumXmtLncPROPs) reaches 291 in the example tree based network scenario (FIG. 11). Although the source-initiated scheme (e.g., Src_Initiated as viewed in FIG. 13) is less complex to implement than the receiver-initiated scheme (e.g., Rcv_Initiated as viewed in FIG. 13), the receiver-initiated scheme generates less LNC PROP packets (e.g., 97 packets) than the source-initiated scheme (e.g., 122 packets), thereby being more robust than that source-initiated scheme. Both the source-initiated and receiver-initiated schemes perform better than the source-oriented approaches in terms of the numbers of over-the-air (OTA) LNC PROP packets generated and with respect to network formation.

Figure 14:
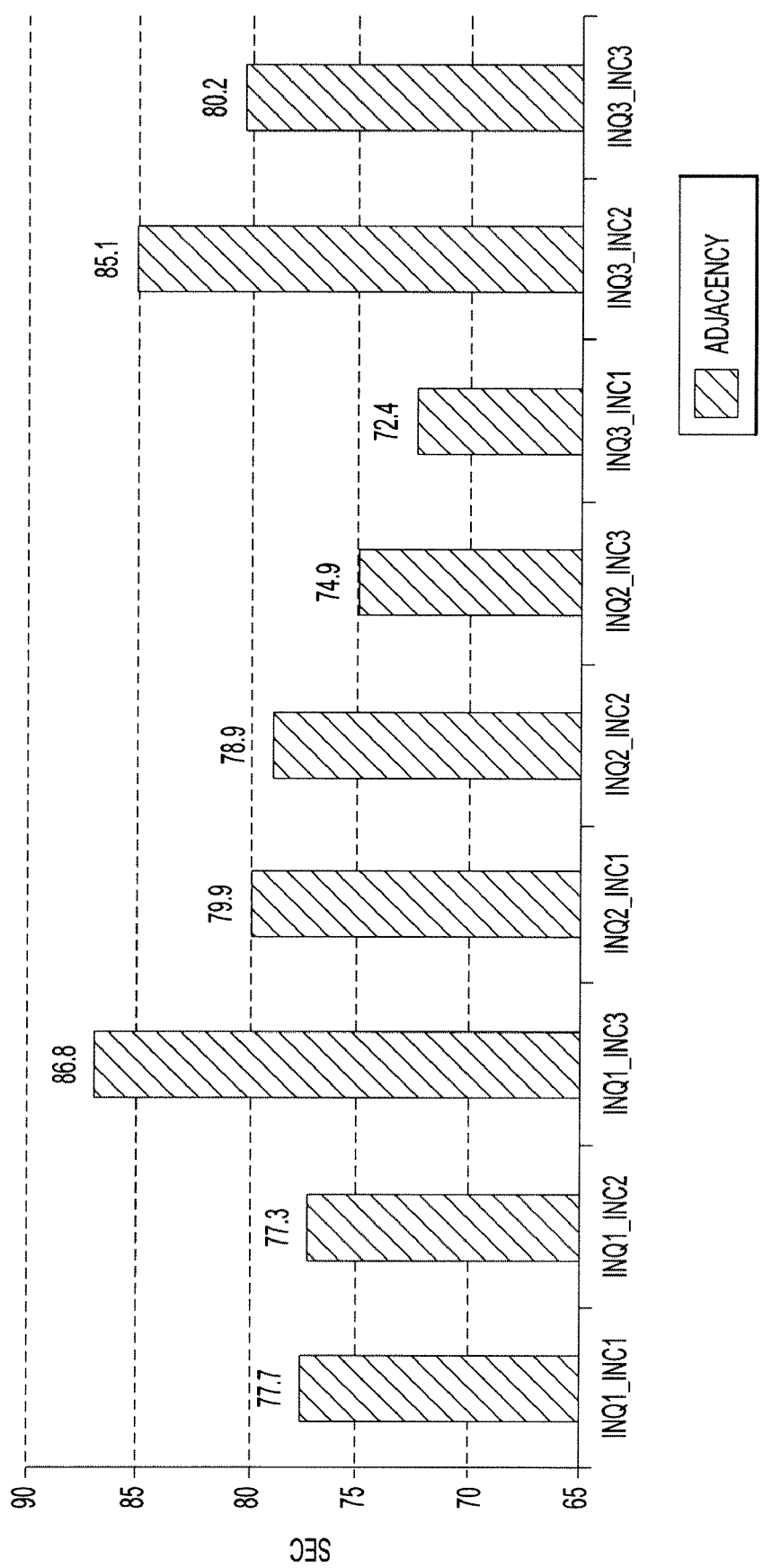
FIG. 14 is a graphical illustration of the adjacency network formation time of a simulated plural tier, plural hop network.

The example network configuration is typical for tree based networks, and is less dense than a typical plural tier/plural hop network in terms of the number of network formation control messages. A fully-connected 50-node plural tier/plural hop network has been simulated with the same parameter set as the example tree based network. The simulation of the denser plural tier/plural hop network reveals the impact of the unnecessary LNC PROP transmissions when using the source-oriented approaches. The adjacency network formation time of the simulated plural tier/plural hop network for the source-oriented approaches is illustrated in FIG. 14 (e.g., where inq1, inq2, and inq3 represent the inquiry/reply PROP parameter settings (values of 1, 2, and 3) for NumberInquiryProps, and lnc1, lnc2, and lnc3 represent the parameter settings (values of 1, 2, and 3) for NumberLncProps). Specifically, the adjacency completion time (e.g., 80.2 seconds) for the higher parameter settings (e.g., inq3_lnc3, or NumberLncPROPs=3 and NumberInquiryPROPs=3) is delayed more than eight seconds, compared to that (e.g., 72.4 seconds) of the lower LNC PROP parameter setting (e.g., inq3_lnc1, or NumberLncPROPs=1 and NumberInquiryPROPs=3). The multiple LNC PROP packet transmissions cause a broadcast storm problem in the dense plural tier/plural hop network.

The present invention source-initiated and receiver-initiated approaches are not merely optimizing parameters for faster bi-directional link and adjacency network formation for sparse or dense network configurations. Rather, the robust neighbor discovery protocols (e.g., the source-initiated and receiver-initiated PROP request) are more efficient and reliable. The source-initiated PROP re-transmission scheme is less robust than the receiver-initiated PROP request scheme, but the source-initiated approach provides a less complex implementation for combination with the source-oriented approaches.

It will be appreciated that the embodiments described above and illustrated in the drawings represent only a few of the many ways of implementing a method and apparatus for controlling packet transmissions within wireless networks to enhance network formation.

The communication networks may be of any type (e.g., wireless, wired, mobile, stationary, Ad-Hoc, any combinations thereof, etc.). The communication networks may include any quantity of nodes or tiers. The network nodes may be arranged in any fashion and include any quantity of formations (e.g., islands, fields, etc.) each having any quantity of nodes. The backbone network may include any quantity of head nodes, while communications within a formation (e.g., islands, fields, etc.) and between neighboring nodes of another tier or formation may utilize the same or different transmission frequencies. The creation of the formations (e.g., islands, etc.) and designation of head/controller nodes may be predetermined or accomplished dynamically via any conventional or other algorithm or technique. The nodes may communicate via any suitable communications medium (e.g., wired or wireless communication devices, etc.).

The nodes of the communication networks may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The nodes may include any quantity of independent transmitting and/or receiving devices, may utilize any quantity of frequency channels of any desired frequencies and may send any type of data. The nodes may further include any quantity of any types of devices (e.g., flight computer, processors, image capture, sensors, etc.) for a particular application. The nodes may include any type of identification including any quantity of any type of symbols or characters (e.g., numeric, alphabetic, alphanumeric, etc.), preferably including a predetermined hierarchy or order. The nodes may employ any conventional access scheme or protocol to access and/or transmit information on data and/or voice channels. The nodes may further include any quantity of any types of input or control devices (e.g., buttons, switches, etc.) to enter voice or data and control node operation, where the nodes may be in the form of any type of radio unit or other communications device.

The processor of the nodes may be implemented by any conventional or other microprocessor, controller or circuitry to perform the functions described herein, while any quantity of processors or processing devices or circuitry may be employed within the nodes where the processor functions may be distributed in any fashion among any quantity of hardware and/or software modules or units, processors or other processing devices or circuits. The software for the processor of the nodes may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The nodes may alternatively include any components arranged in any fashion to facilitate information transfer in the manner described above.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

The packets or messages transmitted by the network (e.g., RTS, CTS, HELLO, PROP, etc.) may be of any size, may have any format and may contain any desired information. The packets may be transmitted via any transmission scheme (e.g., point-to-point, CSMA, TDMA, etc.) and/or at any suitable transmission rate (e.g., with any desired interval between transmissions). The various messages or packets may include any identifier to identify the type of message or packet. The packets may be broadcasted or transmitted any quantity of times.

The counters and timers (e.g., random timer, number of attempts or re-transmissions, response interval timer, etc.) may be implemented by any quantity of any combination of hardware and/or software units or modules. These devices may be within or coupled to the node processor. The timers may monitor any desired time interval, while the counters may adjust and maintain counts in any desired fashion (e.g., increment by any value, decrement by any value, start at any initial values, etc.). The random and response timer intervals, and the quantity of attempts or re-transmissions may be set to any desired values to accommodate particular applications. The randomized timer may employ any conventional or other algorithms for selecting a random number. The randomized timer may alternatively be implemented by a timer with a definite time interval determined in any suitable manner for the particular application. The various counts may be compared to the corresponding thresholds in any desired fashion (e.g., greater than, less than, less than or equal to, greater than or equal to, equal to, not equal to, compared to threshold values within a range, etc.).

The tables and lists (e.g., neighbor table, network formation, neighbor list, etc.) may include any desired information and may be arranged in any fashion. The database update and neighbor discovery packets may be transmitted at any desired intervals and/or in response to any desired events or conditions. The node database may be implemented by any conventional database or other storage structure (e.g., processor memory, external memory, file, data structure (e.g., array, queue, stack, etc.), etc.) and may have any desired storage capacity to contain any desired information.

The source-initiated neighbor discovery may be utilized in connection with any suitable control or other messages (e.g., RTS, CTS, HELLO, etc.). The re-transmission may be based on any quantity of any suitable parameters (e.g., quantity of neighbors, node status, etc.). The re-transmission may be controlled based on the presence of any quantity of neighboring nodes. The links may be established based on an any quantity of exchanges of any suitable packets (e.g., PROP, HELLO, etc.). The neighbor discovery may employ any quantity of attempts or re-transmissions to attain desired network characteristics. The randomized timer may be set to any desired random or definite time period.

The source-initiated LNC PROP transmission may be based on any quantity of any suitable parameters (e.g., change in node or network characteristics (e.g., island head/controller/upstream node, change in parameters, quantity of re-transmissions, etc.). The re-transmission may be controlled to occur one or more times. Any quantity of any suitable parameters may change or be maintained in order to define the steady-state and enable a re-transmission. Further, the steady-state may be considered to be maintained or changed based on parameters remaining within desired ranges. The LNC PROP transmission may employ any quantity of attempts or re-transmissions to attain desired network characteristics. The randomized timer may be set to any desired random or definite time period.

The receiver-initiated approach may be utilized in connection with expected receipt of any suitable control or other messages (e.g., RTS, CTS, HELLO, etc.). The re-transmission request may be communicated within any suitable bits of any desired packets (e.g., HELLO packet, etc.). The request may include any coding scheme of any quantity of bits and any corresponding values to indicate the type of packet desired for-re-transmission. The re-transmission may employ any quantity of attempts or requests for re-transmission to attain desired network characteristics. The randomized timer may be set to any desired random or definite time period.

The embodiments of the present invention are not limited to the applications or networks described above, and may be applied to various military or other Ad-Hoc networks, including airborne, ship-based, and mixed ground-based/airborne/ship-based network configurations.

From the foregoing description, it will be appreciated that the invention makes available a novel method and apparatus for controlling packet transmissions within wireless networks to enhance network formation, wherein network formation in wireless networks is enhanced based on control of network organizational packet transmissions.

Having described preferred embodiments of a new and improved method and apparatus for controlling packet transmissions within wireless networks to enhance network formation, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication unit to transmit and receive information within a wireless communications network including a plurality of communication units and to control transference of said information to enhance network formation comprising:
   a transmitter to transmit outgoing information to at least one other communication unit within said network;
   a receiver to receive incoming information from at least one other communication unit within said network; and
   a processor to control said transmission and reception of said outgoing and incoming information, wherein said processor includes:
      a network formation module to control re-transmission of a network organizational packet previously transmitted by said communication unit to reduce packet transmissions during formation of said communications network, wherein said network organizational packet includes information enabling formation of said communications network by said communication units, and wherein said network formation module includes:
         a neighbor discovery module to exchange said network organizational packets with one or more other communication units to determine neighboring units; and
         a unit change module to transmit said network organizational packet indicating a change in network topology;
      wherein said re-transmission of said network organizational packet previously transmitted by said communication unit is selectively enabled based on one of a request for re-transmission of an expected network organizational packet that failed to be received and said topology of said plurality of communication units within said communications network.

2. The unit of claim 1, wherein said communications network includes an ad-hoc network.

3. The unit of claim 1, wherein said incoming and outgoing information is in the form of Radio Frequency (RF) signals.

4. The unit of claim 1, wherein said neighbor discovery module enables re-transmission of said network organizational packets in response to said communication unit including at least one neighboring unit.

5. The unit of claim 1, wherein said change in network topology relates to a change of one of a controller unit and a relay unit, and said unit change module enables re-transmission of said network organizational packet indicating a change in response to conditions within said communications network remaining constant and the absence of a prior re-transmission of that packet.

6. The unit of claim 1, wherein said network formation module includes:
   a request module to transmit said request within said communication link status packet for said re-transmission of said network organizational packet in response to failure to receive said network organizational packet within a time interval.

7. The unit of claim 6, wherein said link status packet includes a HELLO packet.

8. The unit of claim 1, wherein said network organizational packet includes a Packet Radio Organizational packet.

9. A communications network comprising:
   a plurality of communication units for transferring information therebetween, wherein re-transmission of a network organizational packet previously transmitted by a communication unit is controlled to reduce packet transmissions during formation of said communications network, wherein said network organizational packet includes information enabling formation of said communications network by said communication units, wherein each communication unit includes a neighbor discovery module to exchange said network organizational packets with one or more other communication units to determine neighboring units, and a unit change module to transmit said network organizational packet indicating a change in network topology, and wherein said re-transmission of said network organizational packet previously transmitted by said communication unit is selectively enabled based on one of a request for re-transmission of an expected network organizational packet that failed to be received and said topology of said communications network.

10. The network of claim 9, wherein said communications network includes an ad-hoc network.

11. The network of claim 9, wherein said communication units communicate via Radio Frequency (RF) signals.

12. The network of claim 9, wherein each neighbor discovery module enables re-transmission of said network organizational packets in response to said communication unit including at least one neighboring unit.

13. The network of claim 9, wherein said change in said network topology relates to a change of one of a controller unit and a relay unit, and each said communication unit enables re-transmission of said network organizational packet indicating a change in response to conditions within said communications network remaining constant and the absence of a prior re-transmission of that packet.

14. The network of claim 9, wherein each communication unit includes:
   a request module to transmit said request within said communication link status packet for said re-transmission of said network organizational packet in response to failure to receive said network organizational packet within a time interval.

15. The network of claim 14, wherein said link status packet includes a HELLO packet.

16. The network of claim 9, wherein said network organizational packet includes a Packet Radio Organizational packet.

17. A method of controlling transference of information between a communication unit and other units within a communications network to enhance network formation comprising:
   (a) controlling re-transmission of a network organizational packet previously transmitted by said communication unit to reduce packet transmissions during formation of said communications network, wherein said network organizational packet includes information enabling formation of said communications network by said communication units, and step (a) further includes:
      (a.1) exchanging said network organizational packets with one or more other communication units to determine neighboring units;
      (a.2) transmitting said network organizational packet from said communication unit indicating a change in network topology; and (a.3) selectively enabling said re-transmission of said network organizational packet previously transmitted by said communication unit based on one of a request for re-transmission of an expected network organizational packet that failed to be received and said topology of said communications network.

18. The method of claim 17, wherein said communications network includes an ad-hoc network.

19. The method of claim 17, wherein said communication units communicate via Radio Frequency (RF) signals.

20. The method of claim 17, wherein step (a.3) further includes:
enabling re-transmission of said network organizational packets in response to said communication unit including at least one neighboring unit.

21. The method of claim 17, wherein step (a.3) further includes:
enabling re-transmission of said network organizational packet indicating a change in response to conditions within said communications network remaining constant and the absence of a prior re-transmission of that packet, and wherein said change in said network topology relates to a change of one of a controller unit and a relay unit.

22. The method of claim 17, wherein step (a.3) further includes:
(a.3) requesting within said communication link status packet for said re-transmission of said network organizational packet in response to failure of said communication unit to receive said network organizational packet within a time interval.

23. The method of claim 22, wherein said link status packet includes a HELLO packet.

24. The method of claim 17, wherein said network organizational packet includes a Packet Radio Organizational packet.

* * * * *